US012785224B2

(12) United States Patent
Park et al.

(10) Patent No.: US 12,785,224 B2
(45) Date of Patent: Nov. 3, 2026

(54) SECONDARY BATTERY AND METHOD OF MANUFACTURING THE SAME

(71) Applicant: LG Energy Solution, Ltd., Seoul (KR)

(72) Inventors: Sang Joon Park, Daejeon (KR); Jin Uk Do, Daejeon (KR); Hyun Hee Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

(21) Appl. No.: 19/297,817

(22) Filed: Aug. 12, 2025

(65) Prior Publication Data

US 2026/0051632 A1 Feb. 19, 2026

(30) Foreign Application Priority Data

Aug. 13, 2024 (KR) ........................ 10-2024-0108531
Mar. 25, 2025 (KR) ........................ 10-2025-0037653
Aug. 11, 2025 (KR) ........................ 10-2025-0110947

(51) Int. Cl.
*H01M 50/54* (2021.01)
*H01M 50/528* (2021.01)
(Continued)

(52) U.S. Cl.
CPC ......... *H01M 50/54* (2021.01); *H01M 50/533* (2021.01); *H01M 50/536* (2021.01); *H01M 50/593* (2021.01)

(58) Field of Classification Search
None
See application file for complete search history.

(56) References Cited

U.S. PATENT DOCUMENTS 5,264,306 A 11/1993 Walker, Jr. et al.
2013/0029206 A1* 1/2013 Lev .................... H01M 50/516 429/161
(Continued)

FOREIGN PATENT DOCUMENTS

JP 4821196 B2 11/2011
JP 2013161756 A 8/2013
(Continued)

OTHER PUBLICATIONS

PE2E translation of Shinto (JP 2015103318 A) (Year: 2015).*
International Search Report for Application No. PCT/KR2025/012147 mailed Nov. 23, 2025, 3 pages.

*Primary Examiner* — Maria Laios
*Assistant Examiner* — Zackary Richard Cochenour
(74) *Attorney, Agent, or Firm* — Lerner David LLP

(57) ABSTRACT

A secondary battery includes an electrode assembly and a current collector. The electrode assembly includes a plurality of first electrode plate portions and a plurality of second electrode plate portions arranged to define a stack along a thickness dimension of the electrode assembly. The thickness dimension is smaller than a longitudinal dimension of the electrode assembly. Each of the plurality of first electrode plate portions includes a first electrode tab and forms a plurality of first electrode tabs, and each of the plurality of second electrode plate portions includes a second electrode tab and forms a plurality of second electrode tabs. The current collector includes at least a portion located between the plurality of first and second electrode tabs. The plurality of first electrode tabs and the plurality of second electrode tabs are offset from one another along the thickness dimension with the current collector interposed therebetween.

6 Claims, 20 Drawing Sheets

(51) Int. Cl.

| | |
|---|---|
| ***H01M 50/533*** | (2021.01) |
| ***H01M 50/536*** | (2021.01) |
| ***H01M 50/593*** | (2021.01) |

(56) References Cited

U.S. PATENT DOCUMENTS

| | | | | |
|---|---|---|---|---|
| 2013/0143109 | A1 | 6/2013 | Kim et al. | |
| 2013/0252053 | A1 | 9/2013 | Woo | |
| 2015/0380715 | A1 | 12/2015 | Ahn et al. | |
| 2016/0336574 | A1 | 11/2016 | Guen et al. | |
| 2017/0214028 | A1 | 7/2017 | Oh et al. | |
| 2020/0373548 | A1 | 11/2020 | Kozuki | |
| 2021/0175567 | A1 | 6/2021 | Kim et al. | |
| 2021/0184265 | A1 | 6/2021 | Batson et al. | |
| 2021/0257649 | A1* | 8/2021 | Cho | H01M 10/045 |
| 2022/0367987 | A1 | 11/2022 | Xu et al. | |
| 2023/0216155 | A1* | 7/2023 | Aizawa | H01M 10/0431<br>429/161 |
| 2023/0352801 | A1* | 11/2023 | Yun | H01M 10/04 |
| 2024/0106086 | A1 | 3/2024 | Huang | |
| 2024/0154258 | A1 | 5/2024 | Yeo et al. | |
| 2024/0154259 | A1 | 5/2024 | Kim et al. | |
| 2024/0154267 | A1 | 5/2024 | Park | |

FOREIGN PATENT DOCUMENTS

| | | | | |
|---|---|---|---|---|
| JP | 2015103318 | A | 6/2015 | |
| JP | 6252359 | B2 | 12/2017 | |
| JP | 7358329 | B2 | 10/2023 | |
| KR | 101483133 | B1 | 1/2015 | |
| KR | 101822841 | B1 | 3/2018 | |
| KR | 20180026910 | A | 3/2018 | |
| KR | 20180131798 | A | 12/2018 | |
| KR | 102204700 | B1 | 1/2021 | |
| KR | 20210103340 | A | 8/2021 | |
| KR | 102483338 | B1 | 1/2023 | |
| KR | 20240034640 | A | 3/2024 | |
| KR | 20240061085 | A | 5/2024 | |
| KR | 20240063429 | A | 5/2024 | |
| KR | 20240067469 | A | 5/2024 | |
| WO | WO-2022092878 | A1 * | 5/2022 | H01M 50/116 |

* cited by examiner

F-F'

SECONDARY BATTERY AND METHOD OF MANUFACTURING THE SAME

CROSS-REFERENCE TO RELATED APPLICATION

The present application claims priority to and the benefit of Korean Patent Application Nos. 10-2024-0108531, 10-2025-0037653 and 10-2025-0110947, respectively filed on Aug. 13, 2024, Mar. 25, 2025 and Aug. 11, 2025, in the Korean Intellectual Property Office, the entire disclosures of which are incorporated herein by reference.

BACKGROUND

1. Technical Field

The present disclosure relates to a secondary battery and a method of manufacturing the secondary battery, and more particularly, to a secondary battery and a method of manufacturing the secondary battery, in which a plurality of first electrode tabs and a plurality of second electrode tabs are respectively welded to a first current collecting portion and a second current collecting portion of a current collector.

2. Related Art

Recently, as the demand for portable electronic devices has rapidly increased and the development of electric vehicles, energy storage batteries, robots, satellites, and the like has become more active, intensive research has been conducted on high-performance secondary batteries capable of repeated charging and discharging.

Secondary batteries may be classified, according to the shape of a battery casing, into (1) a can-type secondary battery, in which an electrode assembly is embedded in a metal can, and (2) a pouch-type secondary battery, in which an electrode assembly is embedded in a pouch formed of an aluminum laminate sheet. The can-type secondary battery may also be classified into a cylindrical secondary battery and a prismatic secondary battery according to the shape of the metal can.

In secondary batteries, an electrode tab of an electrode assembly and a current collector are coupled to each other by welding. When welding the electrode tab and the current collector, the electrode tab is bent in a bending direction to increase a contact area between the electrode tab and the current collector, and the current collector is seated on an upper portion of the electrode tab and then welded thereto.

However, in this case, there is a risk that a separator may be damaged during the process of welding the current collector and the electrode tab placed under the current collector. In addition, as the capacity of the secondary battery increases, the number of electrode tabs that are required to be welded at once increases, and thus, there is a risk that electrode tabs spaced far from the current collector may not be properly welded.

Accordingly, there is a need to develop a secondary battery that eliminates the risk of damaging the separator and enables stable welding of a large number of electrode tabs to the current collector.

SUMMARY

An object of the present disclosure is to provide a secondary battery and a method of manufacturing the secondary battery, which can reduce or prevent an undesired alteration on an electrode assembly when an electrode tab is welded to a current collector.

An object of the present disclosure is to provide a secondary battery and a method of manufacturing the secondary battery, in which a large number of electrode tabs can be reliably welded to the current collector when the electrode tabs are welded to the current collector.

An object of the present disclosure is to provide a secondary battery and a method of manufacturing the secondary battery, in which a plurality of electrode tabs and a current collector may be welded such that none of the plurality of electrode tabs remain unwelded.

An object of the present disclosure is to provide a secondary battery and a method of manufacturing the secondary battery, in which interference between different electrode tab assemblies that are welded to the current collector at positions spaced apart from each other may be prevented from occurring.

A secondary battery according to an aspect of the present disclosure may include an electrode assembly and a current collector. The electrode assembly may include an electrode portion, and a plurality of first electrode tabs and a plurality of second electrode tabs that are formed on one end of the electrode portion. The current collector may be placed on an upper portion of the electrode portion, and may include a first current collecting portion welded to the plurality of first electrode tabs, a second current collecting portion welded to the plurality of second electrode tabs, and a connection portion located between the first current collecting portion and the second current collecting portion and provided with a current collecting protrusion. The plurality of first electrode tabs may be bent in one direction toward and welded to the first current collecting portion of the current collector, and the plurality of second electrode tabs may be bent toward and welded to the second current collecting portion of the current collector in a direction opposite to the one direction in which the first electrode tabs are bent.

In the secondary battery according to an aspect of the present disclosure, the electrode portion may include a plurality of first electrode plates formed with the first electrode tabs at a first position, and a plurality of second electrode plates formed with the second electrode tabs at a second position. The first electrode plates and the second electrode plates may have the same polarity.

In the secondary battery according to an aspect of the present disclosure, the plurality of first electrode tabs and the plurality of second electrode tabs may be spaced apart from each other in a thickness dimension and a longitudinal dimension of the electrode assembly.

In the secondary battery according to an aspect of the present disclosure, the plurality of first electrode tabs may be pre-welded to one another electrode tab, and the plurality of second electrode tabs may be pre-welded to one another electrode tab.

In the secondary battery according to an aspect of the present disclosure, the first current collecting portion and the second current collecting portion may be arranged in the current collector in the longitudinal dimension of the electrode assembly.

In the secondary battery according to an aspect of the present disclosure, the current collector may be placed between the plurality of first electrode tabs and the plurality of second electrode tabs.

In the secondary battery according to an aspect of the present disclosure, a protective layer may be placed under the current collector.

In the secondary battery according to an aspect of the present disclosure, the current collector may have a thickness ranging from about 0.5 mm to about 3.0 mm.

In the secondary battery according to an aspect of the present disclosure, the current collecting protrusion may be formed of the same material as the first current collecting portion and the second current collecting portion.

In the secondary battery according to an aspect of the present disclosure, the current collecting protrusion may be formed of a material different from that of the first current collecting portion and the second current collecting portion.

In the secondary battery according to an aspect of the present disclosure, the electrode portion may include separators located between the plurality of first electrode plates and between the plurality of second electrode plates, respectively. The electrode assembly may be formed by stacking or winding the plurality of first electrode plates, the plurality of second electrode plates, and the separators.

The secondary battery according to an aspect of the present disclosure may further include a casing and a cap assembly. The casing may have one open end, and may accommodate the electrode assembly therein. The cap assembly may be coupled to the one open end of the casing, and may include an electrode terminal electrically connected to the current collector.

In the secondary battery according to an aspect of the present disclosure, a through hole may be formed in the electrode terminal. The current collecting protrusion may be inserted into the through hole of the electrode terminal.

A method of manufacturing a secondary battery according to an aspect of the present disclosure may include a preparation operation of preparing an electrode assembly including an electrode portion, and a plurality of first electrode tabs and a plurality of second electrode tabs that are formed on one end of the electrode portion, a primary welding operation of welding the plurality of first electrode tabs to one another electrode tab, and welding the plurality of second electrode tabs to one another electrode tab, a current collector displacement operation of placing a current collector between the plurality of first electrode tabs that are primarily welded and the plurality of second electrode tabs that are primarily welded, a bending operation of bending the plurality of first electrode tabs onto an upper surface of a first current collecting portion of the current collector, and bending the plurality of second electrode tabs onto an upper surface of a second current collecting portion of the current collector, and a secondary welding operation of welding the plurality of first electrode tabs to the first current collecting portion, and welding the plurality of second electrode tabs to the second current collecting portion.

In the method of manufacturing the secondary battery according to an aspect of the present disclosure, the plurality of first electrode tabs and the plurality of second electrode tabs may have the same polarity.

In the method of manufacturing the secondary battery according to an aspect of the present disclosure, the current collector may be provided such that the first current collecting portion and the second current collecting portion are arranged in a longitudinal dimension of the electrode assembly.

In the method of manufacturing the secondary battery according to an aspect of the present disclosure, a protective layer may be placed under the current collector.

In the method of manufacturing the secondary battery according to an aspect of the present disclosure, the current collector may include a current collecting protrusion provided between the first current collecting portion and the second current collecting portion and formed of a material different from that of the first current collecting portion and the second current collecting portion.

In the method of manufacturing the secondary battery according to an aspect of the present disclosure, the current collector may include a current collecting protrusion provided between the first current collecting portion and the second current collecting portion and formed of the same material as the first current collecting portion and the second current collecting portion.

A secondary battery according to an aspect of the present disclosure may include a plurality of first electrode plates each including a first electrode tab.

The secondary battery according to an aspect of the present disclosure may include a plurality of second electrode plates each including a second electrode tab, and having the same polarity as the plurality of first electrode plates.

The secondary battery according to an aspect of the present disclosure may include an electrode assembly formed by stacking the plurality of first electrode plates and the plurality of second electrode plates, and having a length in a first dimension and a thickness in a thickness dimension perpendicular to the first dimension.

The secondary battery according to an aspect of the present disclosure may include a terminal connecting the electrode assembly to an external device.

The secondary battery according to an aspect of the present disclosure may include a current collector including a first current collecting portion, a second current collecting portion spaced apart from the first current collecting portion, and a current collecting protrusion formed between the first current collecting portion and the second current collecting portion and connected to the terminal.

According to an aspect of the present disclosure, the respective first electrode tabs of the plurality of first electrode plates may be bent in the second dimension and welded to the first collecting portion, and the respective second electrode tabs of the plurality of second electrode plates may be bent in the second dimension and welded to the second collecting portion. The current collecting protrusion may be located between the first electrode tabs and the second electrode tabs.

The secondary battery according to an aspect of the present disclosure may include a first electrode tab assembly formed by coupling the respective first electrode tabs of the plurality of first electrode plates to each other, and welded to the first current collecting portion.

The secondary battery according to an aspect of the present disclosure may include a second electrode tab assembly formed by coupling the respective second electrode tabs of the plurality of second electrode plates to each other, and welded to the second current collecting portion.

According to an aspect of the present disclosure, at least a portion of the first electrode tab assembly and at least a portion of the second electrode tab assembly may be bent in directions opposite to each other, and welded to the current collector.

The current collector according to an aspect of the present disclosure may include a lower surface facing the electrode assembly.

The current collector according to an aspect of the present disclosure may include an upper surface facing the terminal.

The first electrode tab assembly and the second electrode tab assembly according to an aspect of the present disclosure may be welded to the upper surface of the current collector.

The first electrode tab assembly according to an aspect of the present disclosure may include a first-1 assembly portion including a first assembly weld portion formed by coupling the respective first electrode tabs of the plurality of first electrode plates to each other, the first-1 assembly portion being welded to the first current collecting portion.

The second electrode tab assembly according to an aspect of the present disclosure may include a second-1 assembly portion including a second assembly weld portion formed by coupling the respective second electrode tabs of the plurality of second electrode plates to each other, the second-1 assembly portion being welded to the second current collecting portion.

The first electrode tab assembly according to an aspect of the present disclosure may include a first-2 assembly portion located between the first current collecting portion and the electrode assembly.

The second electrode tab assembly according to an aspect of the present disclosure may include a second-2 assembly portion located between the second current collecting portion and the electrode assembly.

The first electrode tab assembly according to an aspect of the present disclosure may include a first-3 assembly portion extending in a direction away from the current collector.

The second electrode tab assembly according to an aspect of the present disclosure may include a second-3 assembly portion extending in a direction away from the current collector.

The current collector according to an aspect of the present disclosure may include a connection portion having at least a portion located between the first electrode tabs and the second electrode tabs, with the current collecting protrusion protruding from the connection portion.

The first electrode tabs and the second electrode tabs according to an aspect of the present disclosure may be spaced apart from each other in the first dimension.

The electrode assembly according to an aspect of the present disclosure may include a bridge portion formed between the first electrode tabs and the second electrode tabs.

The current collecting protrusion according to an aspect of the present disclosure may protrude toward the terminal at a position corresponding to the bridge portion.

The secondary battery according to an aspect of the present disclosure may include a plurality of second electrode plates each including a second electrode tab.

The secondary battery according to an aspect of the present disclosure may include an electrode assembly including a first stack portion having a length in a first dimension and a thickness in a second dimension perpendicular to the first dimension, the first stack portion being formed by stacking the plurality of the first electrode plates, and a second stack portion formed by stacking the plurality of second electrode plates and stacked with the first stack portion in the second dimension.

The secondary battery according to an aspect of the present disclosure may include a first electrode tab assembly formed in the first stack portion by coupling the respective first electrode tabs of the plurality of first electrode plates, and located in a first region among a plurality of regions of the electrode assembly sectioned from each other in the first dimension.

The secondary battery according to an aspect of the present disclosure may include a second electrode tab assembly formed in the second stack portion by coupling the respective second electrode tabs of the plurality of second electrode plates, and located in a second region different from the first region among the plurality of regions of the electrode assembly sectioned from each other in the first dimension.

According to an aspect of the present disclosure, at least a portion of the first electrode tab assembly and at least a portion of the second electrode tab assembly may not overlap each other in the first dimension.

The first electrode tab assembly and the second electrode tab assembly according to an aspect of the present disclosure may not overlap each other in the second dimension.

The secondary battery according to an aspect of the present disclosure may include a current collector welded to the first electrode tab assembly and the second electrode tab assembly.

The electrode assembly according to an aspect of the present disclosure may include a bridge portion formed between the first electrode tab assembly and the second electrode tab assembly spaced apart from each other, the bridge portion facing at least a portion of the current collector.

The first electrode tab assembly according to an aspect of the present disclosure may include a first-1 assembly portion bent toward the second stack portion.

The second electrode tab assembly according to an aspect of the present disclosure may include a second-1 assembly portion bent toward the first stack portion.

The secondary battery according to an aspect of the present disclosure may include a first electrode tab assembly formed by welding the respective first electrode tabs of the plurality of first electrode plates to each other.

The secondary battery according to an aspect of the present disclosure may include a second electrode tab assembly formed by welding the respective second electrode tabs of the plurality of second electrode plates to each other.

The secondary battery according to an aspect of the present disclosure may include a current collector to which the first electrode tab assembly and the second electrode tab assembly are welded.

The first electrode tab assembly according to an aspect of the present disclosure may include a first assembly weld portion formed by welding the respective first electrode tabs of the plurality of first electrode plates to each other.

The first electrode tab assembly according to an aspect of the present disclosure may include a first current collector weld portion formed by being welded to the current collector.

The second electrode tab assembly according to an aspect of the present disclosure may include a second assembly weld portion formed by welding the respective second electrode tabs of the plurality of second electrode plates to each other.

The second electrode tab assembly according to an aspect of the present disclosure may include a second current collector weld portion formed by being welded to the current collector.

The first electrode tab assembly according to an aspect of the present disclosure may include a first-1 assembly portion in which the first assembly weld portion and the first current collector weld portion are formed.

The second electrode tab assembly according to an aspect of the present disclosure may include a second-1 assembly portion in which the second assembly weld portion and the second current collector weld portion are formed.

The secondary battery according to an aspect of the present disclosure may include an electrode assembly formed by stacking the plurality of first electrode plates and the plurality of second electrode plates.

The first electrode tab assembly according to an aspect of the present disclosure may include a first-2 assembly portion located between the first current collector weld portion and the electrode assembly.

The second electrode tab assembly according to an aspect of the present disclosure may include a second-2 assembly portion located between the second current collector weld portion and the electrode assembly.

The current collector according to an aspect of the present disclosure may include a first current collecting portion located between the first current collector weld portion and the first-2 assembly portion.

The current collector according to an aspect of the present disclosure may include a second current collecting portion located between the second current collector weld portion and the second-2 assembly portion.

The current collector according to an aspect of the present disclosure may include a lower surface facing the electrode assembly.

The current collector according to an aspect of the present disclosure may include a first weld surface which faces in a direction opposite to the lower surface, and on which the first assembly weld portion and the first current collector weld portion are joined.

The current collector according to an aspect of the present disclosure may include a second weld surface which faces in the direction opposite to the lower surface, and on which the second assembly weld portion and the second current collector weld portion are joined.

The secondary battery according to an aspect of the present disclosure may include an electrode assembly formed by stacking the plurality of first electrode plates and the plurality of second electrode plates.

The secondary battery according to an aspect of the present disclosure may include a current collector including a first surface facing the electrode assembly, and a second surface opposite to the first surface, the current collector including at least a portion located between the first electrode tabs and the second electrode tabs.

The first electrode tabs and the second electrode tabs according to an aspect of the present disclosure may be welded to the second surface at offset positions with the current collector.

The first electrode tab assembly and the second electrode tab assembly according to an aspect of the present disclosure may be welded to the second surface at positions at which the first electrode tab assembly and the second electrode tab assembly do not overlap each other in a thickness or stacking dimension of the current collector.

The current collector according to an aspect of the present disclosure may include a first weld surface forming at least a portion of the second surface.

The current collector according to an aspect of the present disclosure may include a second weld surface that forms at least a portion of the second surface and is spaced apart from the first weld surface.

According to an aspect of the present disclosure, the first electrode tab assembly may be welded to the first weld surface, and the second electrode tab assembly may be welded to the second weld surface.

The secondary battery according to an aspect of the present disclosure may include an insulator including at least a portion located between the current collector and the electrode assembly, the insulator covering at least a portion of the first-1 assembly portion and at least a portion of the second-1 assembly portion.

The current collector according to an aspect of the present disclosure may include a current collecting protrusion formed between an edge of the electrode assembly and the first and second electrode tabs.

The secondary battery according to an aspect of the present disclosure may include a cover covering the first and second electrode tabs welded to the current collector.

According to a first aspect of the disclosure, a secondary battery may include an electrode assembly and a current collector. The electrode assembly may include an electrode portion having a plurality of first tabs and a plurality of second tabs protruding outwardly in a protrusion direction from a first side of the electrode portion. The current collector may be positioned adjacent to and extending alongside the first side of the electrode portion, and may be oriented along a transverse plane defined by a first dimension and a second dimension extending orthogonal to one another and both extending transverse to the protrusion direction. The current collector may include a first current collecting portion coupled to the plurality of first tabs and a second current collecting portion coupled to the plurality of second tabs. The plurality of first tabs may be bent to extend in a first direction so as to be coupled to the first current collecting portion. The plurality of second tabs may be bent to extend in a second direction so as to be coupled to the second current collecting portion, the second direction being opposite the first direction along the first dimension. The plurality of first tabs and the plurality of second tabs may be spaced from each other in both the first dimension and the second dimension along the transverse plane of the current collector.

Further in the first aspect of the disclosure, the current collector may include a connection portion located between the first current collecting portion and the second current collecting portion, and the connection portion may include a current collecting protrusion protruding outwardly along the protrusion direction. The current collecting protrusion may be formed of a same material as the first current collecting portion and the second current collecting portion. The current collecting protrusion may be formed of a material different from a material of the first current collecting portion and a material of the second current collecting portion.

Further in the first aspect of the disclosure, the secondary battery may further include a casing and a cap assembly. The casing may have an open end and may be configured to accommodate the electrode assembly therein such that the first side of the electrode of the electrode portion is positioned adjacent to the open end. The cap assembly may be coupled to the open end of the casing. The cap assembly may include an electrode terminal electrically connected to the current collector. A through hole may be defined in the electrode terminal. The current collecting protrusion may be positioned in the through hole of the electrode terminal.

Further in the first aspect of the disclosure, the electrode portion may include a plurality of first electrode plates each electrically coupled with a respective one of the plurality of first tabs in a first region of the first side, and a plurality of second electrode plates each electrically coupled with a respective one of the plurality of second tabs in a second region of the first side. The first and second regions may be spaced apart from one another along the transverse plane. The first electrode plates and the second electrode plates may both share a first polarity. The electrode portion may include a respective separator portion positioned between each adjacent pair of the plurality of first electrode plates and positioned between each adjacent pair of the plurality of second electrode plates. The plurality of first electrode plates, the plurality of second electrode plates, and the separator portions may be stacked or wound within the transverse plane.

Further in the first aspect of the disclosure, the first current collecting portion and the second current collecting portion may be spaced apart along the current collector in the second dimension. The current collector may be elongated along a longitudinal dimension, the longitudinal dimension being parallel to the second dimension. An insulator may be positioned between the current collector and the electrode portion. The electrode portion may be defined by a plurality of electrode plates spaced apart within the transverse plane by respective separator portions positioned therebetween. The plurality of electrode plates and respective separator portions positioned therebetween may be stacked in a thickness dimension (which may also be referred to as "stacking dimension," which does not preclude winding into a jelly-roll assembly, as discussed herein), the thickness dimension being parallel to the first dimension of the transverse plane of the current collector. The current collector may be positioned between the plurality of first tabs and the plurality of second tabs along the thickness dimension.

Further in the first aspect of the disclosure, the plurality of first tabs may be joined together into a first group by welding, and the plurality of second tabs may be joined together into a second group by welding.

According to a second aspect of the disclosure, a method of manufacturing a secondary battery may include preparing an electrode assembly including an electrode portion having a plurality of first tabs and a plurality of second tabs protruding outwardly in a protrusion direction from a first side of the electrode portion; placing a current collector adjacent the first side of the electrode portion such that the current collector extends alongside the first side and is oriented along a transverse plane defined by a first dimension and a second dimension extending orthogonal to one another and both extending transverse to the protrusion direction, wherein the plurality of first tabs are offset from the plurality of second tabs in both the first dimension and the second dimension; bending the plurality of first tabs in a first direction along the first dimension so as to extend along a first current collecting portion of the current collector, and bending the plurality of second tabs in a second direction along the first dimension so as to extend along a second current collecting portion of the current collector, the second direction being opposite the first direction; and coupling the plurality of first tabs to the first current collecting portion, and coupling the plurality of second tabs to the second current collecting portion.

Further in the second aspect of the disclosure, the method of manufacturing the secondary battery may further include coupling the plurality of first tabs to one another before coupling the plurality of first tabs to the first current collecting portion, and coupling the plurality of second tabs to one another before coupling the plurality of second tabs to the second current collecting portion. The coupling of the plurality of first tabs to one another may include welding the plurality of first tabs to one another. The coupling of the plurality of second tabs to one another may include welding the plurality of second tabs to one another. The coupling of the plurality of first tabs to the first current collecting portion may include welding the plurality of first tabs to the first current collecting portion. The coupling of the plurality of second tabs to the second current collecting portion may include welding the plurality of second tabs to the second current collecting portion.

Further in the second aspect of the disclosure, the bending of the plurality of first tabs in the first direction may include bending the plurality of first tabs so as to extend over the first current collecting portion of the current collector with the first current collecting portion being positioned between the electrode portion and the bent plurality of first tabs. The bending of the plurality of second tabs in the second direction may include bending the plurality of second tabs so as to extend over the second current collecting portion of the current collector with the second current collecting portion being positioned between the electrode portion and the bent plurality of second tabs.

According to a third aspect of the disclosure, a secondary battery may include an electrode assembly and a current collector. The electrode assembly may include a plurality of first electrode plates and a plurality of second electrode plates stacked in a stack along a thickness dimension (which may also be referred to as a "stacking dimension," which does not preclude winding into a jelly-roll assembly, as discussed herein). The first electrode plates may have a same polarity as the second electrode plates. The electrode assembly may include an electrode portion defined by the stack of the plurality of first and second electrode plates. Each of the plurality of first electrode plates may include a first electrode tab forming a plurality of first electrode tabs protruding from the electrode portion. Each of the plurality of second electrode plates may include a second electrode tab forming a plurality of second electrode tabs protruding from the electrode portion. The current collector may include a first surface facing the electrode portion and a second surface facing opposite the first surface. The current collector including at least a portion located between the plurality of first electrode tabs and the plurality of second electrode tabs. The plurality of first electrode tabs and the plurality of second electrode tabs may be offset from one another along the thickness dimension with the current collector interposed therebetween, and may be bent toward the second surface and coupled to the second surface.

Further in the third aspect of the disclosure, the secondary battery may further include a first electrode tab assembly and a second electrode tab assembly. The first electrode tab assembly may be defined by the plurality of first electrode tabs coupled to each other, and the second electrode tab assembly may be defined by the plurality of second electrode tabs coupled to each other. The first electrode tab assembly and the second electrode tab assembly may be welded to the second surface at positions at which the first electrode tab assembly and the second electrode tab assembly do not overlap each other in the thickness dimension. At least a portion of the first electrode tab assembly may be bent in a direction from a first side of the current collector toward a second side of the current collector in the thickness dimension, and at least a portion of the second electrode tab assembly may be bent in a direction from the second side of the current collector toward the first side of the current collector in the thickness dimension.

Further in the third aspect of the disclosure, the current collector may include a first weld surface forming at least a portion of the second surface and a second weld surface forming at least a portion of the second surface, the second weld surface being spaced apart from the first weld surface. The first electrode tab assembly may be welded to the first weld surface, and the second electrode tab assembly is welded to the second weld surface. The first electrode tab assembly may include a first-1 assembly portion including a first assembly weld portion formed by coupling the plurality of first electrode tabs to each other. The second electrode tab assembly may include a second-1 assembly portion including a second assembly weld portion formed by coupling the plurality of second electrode tabs to each other. The first electrode tab assembly may include a first-2 assembly portion located between the current collector and the electrode portion. The second electrode tab assembly may include a second-2 assembly portion located between the current collector and the electrode portion. The secondary battery may further include an insulator including at least a portion thereof located between the current collector and the electrode portion, the insulator covering at least a portion of the first-1 assembly portion and at least a portion of the second-1 assembly portion.

Further in the third aspect of the disclosure, the current collector may include a current collecting protrusion located between the plurality of first electrode tabs and the plurality of second electrode tabs. The current collector may include a current collecting protrusion located between an edge of the electrode assembly and the pluralities of first and second electrode tabs. The secondary battery may further include a cover covering the pluralities of first and second electrode tabs welded to the current collector.

According to a fourth aspect of the disclosure, a secondary battery may include an electrode assembly, a first electrode tab assembly, and a second electrode tab assembly. The electrode assembly may include a first stack portion stacked with a second stack portion along a second dimension. The first stack portion may be defined by a stack of a plurality of first electrode plates each including a first electrode tab forming a plurality of first electrode tabs. The first stack portion may have a thickness in the second dimension and a length in a first dimension perpendicular to the second dimension. The second stack portion may be defined by a stack of a plurality of second electrode plates each including a second electrode tab forming a plurality of second electrode tabs. The first electrode tab assembly may be defined by the plurality of first electrode tabs coupled to each other. The first electrode tab assembly may be located in a first region of the electrode assembly along the first dimension. The second electrode tab assembly may be defined by the plurality of second electrode tabs coupled to each other. The second electrode tab assembly may be located in a second region different from the first region of the electrode assembly along the first dimension.

Further in the fourth aspect of the disclosure, the at least a portion of the first electrode tab assembly and at least a portion of the second electrode tab assembly may not overlap each other in the first dimension. The first electrode tab assembly and the second electrode tab assembly may not overlap each other in the second dimension. The secondary battery may further include a current collector welded to the first electrode tab assembly and the second electrode tab assembly. The electrode assembly may include a bridge portion positioned between the first electrode tab assembly and the second electrode tab assembly that are spaced apart from each other. The bridge portion may face at least a portion of the current collector. The first electrode tab assembly may include a first-1 assembly portion bent in a direction toward the second stack portion. The second electrode tab assembly may include a second-1 assembly portion bent in a direction toward the first stack portion.

According to a fifth aspect of the disclosure, a secondary battery may include a plurality of first electrode plates, a first electrode tab assembly, a plurality of second electrode plates, a second electrode tab assembly, and a current collector. The plurality of first electrode plates may each include a first electrode tab forming a plurality of first electrode tabs. The first electrode tab assembly may be defined by the plurality of first electrode tabs welded to each other. The plurality of second electrode plates may each include a second electrode tab forming a plurality of second electrode tabs. The second electrode tab assembly may be defined by the plurality of second electrode tabs welded to each other. The first electrode tab assembly and the second electrode tab assembly may be welded to the current collector. The first electrode tab assembly may include a first assembly weld portion defined by welds joining the plurality of first electrode tabs to each other. The first electrode tab assembly may include a first current collector weld portion defined by welds joining the plurality of first electrode tabs to the current collector. The second electrode tab assembly may include a second assembly weld portion defined by welds joining the plurality of second electrode tabs to each other. The second electrode tab assembly may include a second current collector weld portion defined by welds joining the plurality of second electrode tabs to the current collector.

Further in the fifth aspect of the disclosure, the first electrode tab assembly may include a first-1 assembly portion in which the first assembly weld portion and the first current collector weld portion are formed. The second electrode tab assembly may include a second-1 assembly portion in which the second assembly weld portion and the second current collector weld portion are formed. The secondary battery may further include an electrode assembly defined by a stack of the plurality of first electrode plates stacked with a stack of the plurality of second electrode plates. The first electrode tab assembly may include a collector weld portion and the electrode assembly. The second electrode tab assembly may include a second-2 assembly portion located between the second current collector weld portion and the electrode assembly.

Further in the fifth aspect of the disclosure, the current collector may include a first current collecting portion located between the first current collector weld portion and the first-2 assembly portion. The current collector may include a second current collecting portion located between the second current collector weld portion and the second-2 assembly portion. The secondary battery may further include an electrode assembly defined by a stack of the plurality of first electrode plates stacked with a stack of the plurality of second electrode plates. The current collector may include a lower surface facing the electrode assembly. The current collector may include a first weld surface facing in a direction opposite the lower surface, and on which the first assembly weld portion and the first current collector weld portion are joined. The current collector may include a second weld surface facing in the direction opposite the lower surface, and on which the second assembly weld portion and the second current collector weld portion are joined.

BRIEF DESCRIPTION OF THE DRAWINGS

The following drawings attached to this specification illustrate preferred aspects of the present disclosure, and help to further understand the technical spirit of the present disclosure along with the aforementioned contents of the disclosure. Accordingly, the present disclosure should not be construed as being limited to only contents described in such drawings.

DETAILED DESCRIPTION

Figure 1:
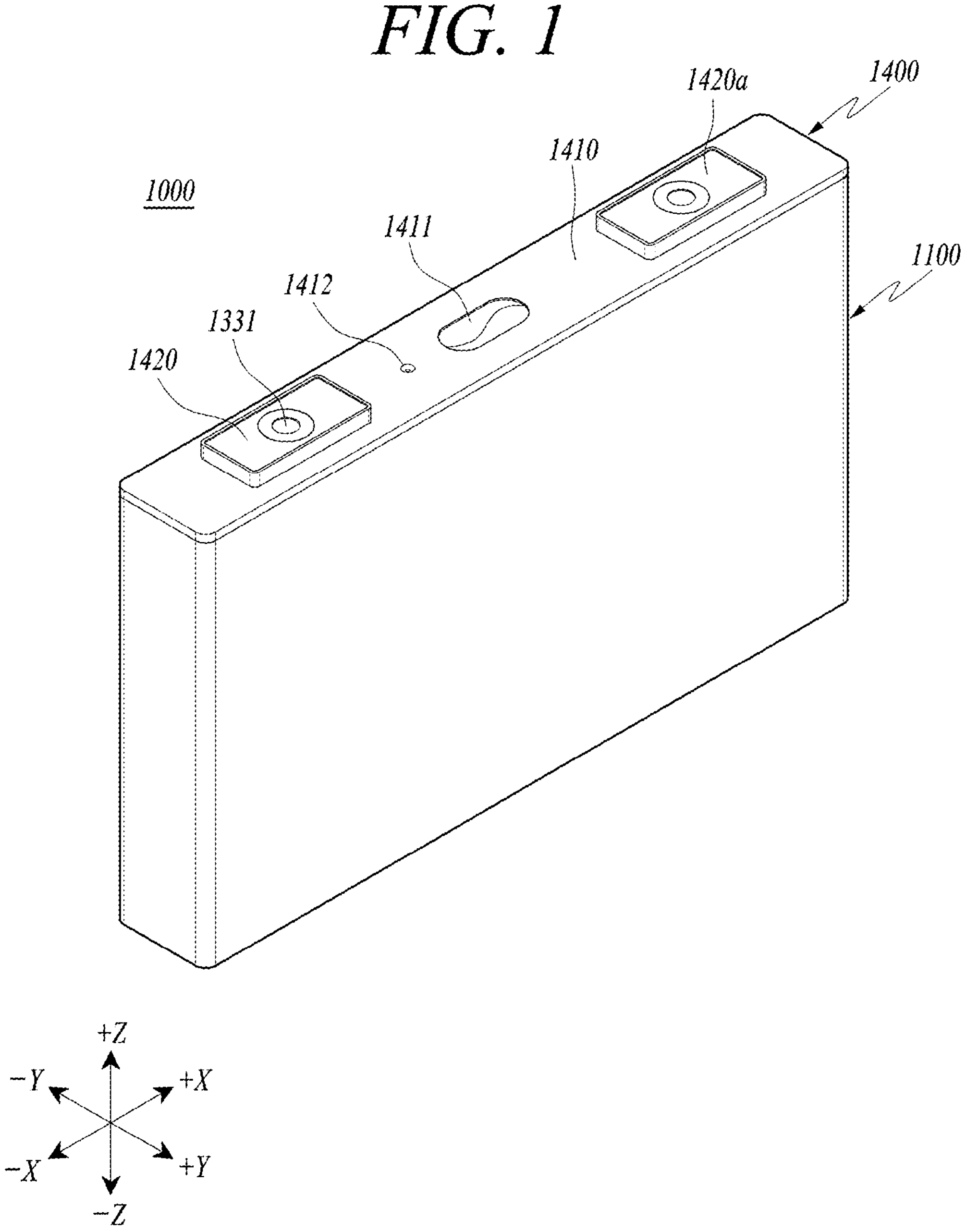
FIG. 1 is a perspective view illustrating a secondary battery according to an aspect of the present disclosure.

Since the present disclosure may be modified in various forms, and may have various aspects, particular aspects will be illustrated in the accompanying drawings and described in detail with reference to the drawings. However, this is not intended to limit the present disclosure to particular modes of practice, and it is to be appreciated that all changes, equivalents, and substitutes that do not depart from the spirit and technical scope of the present disclosure are encompassed in the present disclosure.

The terminology used herein is for the purpose of describing particular aspects only and is not intended to be limiting of the present disclosure. In the present disclosure, singular forms are intended to include the plural forms as well, unless the context clearly indicates otherwise. It will be further understood that the terms “comprise”, “include”, “have”, etc., when used in this specification, are intended to specify the presence of stated features, integers, steps, operations, elements, components, and/or combinations of them but do not preclude the presence or addition of one or more other features, integers, steps, operations, elements, components, and/or combinations thereof.

Hereinafter, aspects of the present disclosure will be described in detail with reference to the accompanying drawings. It should be noted that like reference numerals refer to like elements throughout the attached drawings. Details of well-known configurations and functions may be omitted to avoid unnecessarily obscuring the gist of the present disclosure. For the same reason, in the accompanying drawings, some elements are enlarged, omitted, or depicted schematically.

With reference to FIGS. 1 to 20, dimensions for describing a secondary battery 1000 are defined. A first dimension (+X or −X direction) may be defined. The first dimension (+X or −X direction) may indicate a longitudinal dimension of the secondary battery 1000. The first dimension (+X or −X direction) may correspond to a dimension in which first electrode tabs 1220 and second electrode tabs 1230 are spaced apart from each other. A second dimension (+Y or −Y direction) may be defined. The second dimension (+Y or −Y direction) may indicate a thickness dimension of the secondary battery 1000, which may also correspond to a thickness dimension of electrode plates or may also be referred to as a stacking dimension. It should be noted that use of the term “stacking” dimension herein is not intended to be limited to an electrode assembly that is actually stacked, but would also include other types of assemblies such as wound jelly-roll assemblies that are elongated along a longitudinal dimension so that each of the adjacent generally planar portions of the jelly-roll that extend along the longitudinal dimension can be characterized as being “stacked” or having a “stacking” dimension, even though the electrodes in such an assembly are elongated and wound rather than being discrete components that are stacked on one another. In such an elongated jelly-roll structure, each of the successive, generally planar portions of the jelly-roll may be characterized herein as an “electrode plate portion.” Furthermore, in other electrode assembly structures, in which discrete electrode plates are laminated on one another along a stacking dimension, such discrete electrode plates may also be characterized herein by the term "electrode plate portion." Thus, "electrode plate portion" is intended to be a generic term for each of the generally planar portions (or discrete electrodes) of an electrode assembly which are arranged adjacent to one another in a thickness dimension of the electrode assembly to define a "stack" and which are generally aligned along the longitudinal dimension of the electrode assembly. The thickness dimension may also be defined as the dimension in which the successive electrode plate portions and separators overlap one another. The second dimension (+Y or −Y direction) may correspond to a dimension in which the plurality of first electrode tabs 1220 are aligned with each other. A third dimension (+Z or −Z direction) may be defined. The third dimension (+Z or −Z direction) may indicate a height dimension of the secondary battery 1000. The third dimension (+Z or −Z direction) may correspond to a dimension in which a current collector 1300 and a cap assembly 1400 are coupled. The third dimension (+Z or −Z direction) may also correspond to a dimension along which the first electrode tabs 1220 and second electrode tabs 1230 protrude outwardly away from the electrode portion 1210 of the electrode assembly 1200.

It is noted that the electrode tabs as referenced throughout the disclosure may be formed uniformly or as a whole with the electrode collector, or may include a foil tab that can be formed by notching the electrode collector. In other examples, the electrode tab may be a member that is separately coupled to the electrode assembly.

Figure 2:
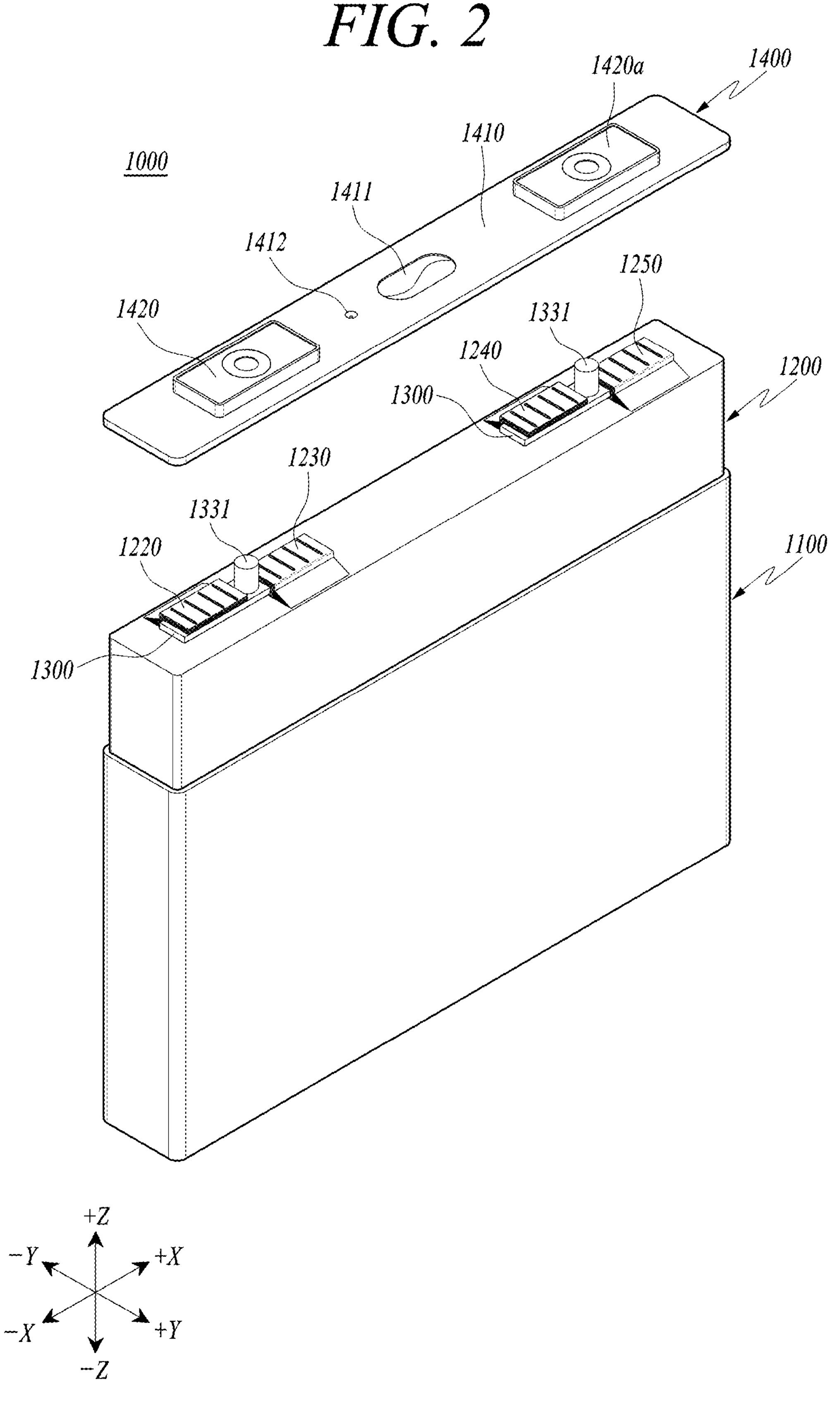
FIG. 2 is a partially-exploded perspective view illustrating the secondary battery according to an aspect of the present disclosure.

Referring to FIGS. 1 and 2, the secondary battery 1000 according to an aspect of the present disclosure may include a casing 1100, an electrode assembly 1200, the current collector 1300, and the cap assembly 1400.

Referring to FIGS. 1 and 2, the casing 1100 may form an outer shape of the secondary battery 1000. A space capable of accommodating the electrode assembly 1200 may be formed in the casing 1100. An opening may be formed in one surface of the casing 1100. In the present aspect, the casing 1100 has a rectangular parallelepiped shape, but the shape of the casing 1100 is not limited thereto and may be modified in various ways. The casing 1100 may be made of a rigid material capable of protecting the electrode assembly 1200 accommodated therein. For example, the casing 1100 may be made of metal such as aluminum or stainless steel.

Referring to FIGS. 1 and 2, an electrolyte may be received in the casing 1100 together with the electrode assembly 1200. The electrolyte may include a lithium salt such as $LiPF_6$ or $LiBF_4$ in an organic solvent such as ethylene carbonate (EC), propylene carbonate (PC), diethyl carbonate (DEC), ethyl methyl carbonate (EMC), or dimethyl carbonate (DMC). The electrolyte may be in a liquid, solid, or gel phase.

Figure 3:
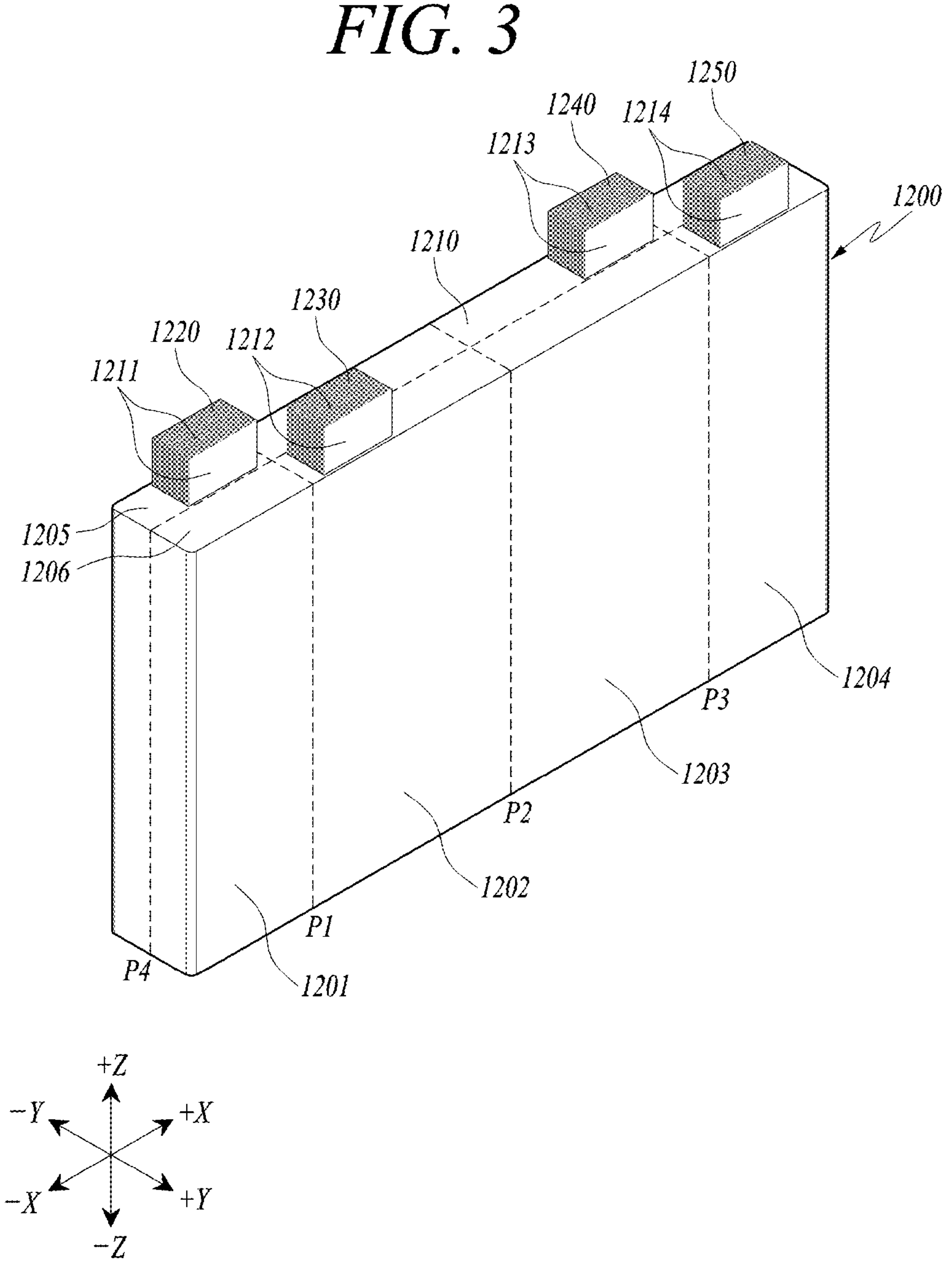
FIG. 3 is a perspective view illustrating an electrode assembly in which a plurality of first and second electrode tabs are formed on an electrode portion in the secondary battery according to an aspect of the present disclosure.

Referring to FIGS. 1, 2, and 3, the electrode assembly 1200 may be accommodated in the casing 1100. As illustrated in FIG. 3, the electrode assembly 1200 may include an electrode portion 1210, as well as the plurality of first electrode tabs 1220 and the plurality of second electrode tabs 1230 projecting outwardly away from the electrode portion 1210. The plurality of first electrode tabs 1220 and the plurality of second electrode tabs 1230 may each be located at or near one longitudinal end of the electrode portion 1210 and may be located along opposite ends of the electrode portion 1210 in the thickness or stacking dimension. The plurality of first electrode tabs 1220 are grouped and aligned with one another, and the plurality of second electrode tabs 1230 are grouped and aligned with one another. The plurality of first electrode tabs 1220 and the plurality of second electrode tabs 1230, which are respectively aligned with one another, are arranged so as not to overlap in the thickness dimension (e.g., the +Y direction) and the longitudinal dimension (e.g., the +X direction) of the electrode assembly 1200. For example, the plurality of first electrode tabs 1220 and the plurality of second electrode tabs 1230 may not overlap each other in the longitudinal dimension (+X direction) of the electrode assembly 1200. By further way of example, the plurality of first electrode tabs 1220 and the plurality of second electrode tabs 1230 may not overlap each other in the thickness dimension (+Y direction) of the electrode assembly 1200. Put another way, the plurality of first electrode tabs 1220 and the plurality of second electrode tabs 1230 may be spaced from each other in the longitudinal dimension (+X direction) of the electrode assembly 1200. Similarly, the plurality of first electrode tabs 1220 and the plurality of second electrode tabs 1230 may be spaced from each other in the thickness dimension (+Y direction) of the electrode assembly 1200. The first electrode tabs 1220 and the second electrode tabs 1230 may be arranged at offset positions with respect to each other in at least one of the thickness or longitudinal dimensions.

Referring to FIGS. 1, 2, and 3, the electrode assembly 1200 may include a plurality of third electrode tabs 1240 and a plurality of fourth electrode tabs 1250. The plurality of third electrode tabs 1240 and the plurality of fourth electrode tabs 1250 may each be located at or near one longitudinal end of the electrode portion 1210 and may be located along opposite ends of the electrode portion 1210 in the thickness or stacking dimension. The plurality of third electrode tabs 1240 are grouped and aligned with one another, and the plurality of fourth electrode tabs 1250 are grouped and aligned with one another. The plurality of third electrode tabs 1240 and the plurality of fourth electrode tabs 1250, which are respectively aligned with one another, are arranged so as not to overlap in the thickness dimension (e.g., the +Y direction) and the longitudinal dimension (e.g., the +X direction) of the electrode assembly 1200. For example, the plurality of third electrode tabs 1240 and the plurality of fourth electrode tabs 1250 may not overlap each other in the longitudinal dimension (+X direction) of the electrode assembly 1200. By further way of example, the plurality of third electrode tabs 1240 and the plurality of fourth electrode tabs 1250 may not overlap each other in the thickness dimension (+Y direction) of the electrode assembly 1200. Put another way, the plurality of third electrode tabs 1240 and the plurality of fourth electrode tabs 1250 may be spaced from each other in the longitudinal dimension (+X direction) of the electrode assembly 1200. Similarly, the plurality of third electrode tabs 1240 and the plurality of fourth electrode tabs 1250 may be spaced from each other in the thickness dimension (+Y direction) of the electrode assembly 1200. The plurality of third electrode tabs 1240 and the plurality of fourth electrode tabs 1250 may be arranged at offset positions with respect to each other in at least one of the thickness or longitudinal dimensions.

Referring to FIGS. 1, 2, and 3, specifically, the electrode portion 1210 may include a plurality of first electrode plates 1211, a plurality of second electrode plates 1212, a plurality of third electrode plates 1213, a plurality of fourth electrode plates 1214, and separators therebetween. In other aspects (not shown), however, the separators between the electrodes may be replaced with a solid electrolyte, which may function as both an electrolyte and a separator that physically separates the electrodes from one another.

Referring to FIGS. 1, 2, and 3, an active material may be applied to each of the plurality of first electrode plates 1211, the plurality of second electrode plates 1212, the plurality of third electrode plates 1213, and the plurality of fourth electrode plates 1214. The plurality of first electrode plates 1211 and the plurality of second electrode plates 1212 may each be formed by applying an active material such as a transition metal oxide to a metal plate such as an aluminum plate. The plurality of first electrode plates 1211 and the plurality of second electrode plates 1212 may have the same polarity, and may be positive electrode plates. The plurality of third electrode plates 1213 and the plurality of fourth electrode plates 1214 may each be formed by applying an active material such as graphite or carbon to a metal plate such as a copper or nickel plate. The plurality of third electrode plates 1213 and the plurality of fourth electrode plates 1214 may have the same polarity, and may be negative electrode plates.

Referring to FIGS. 1, 2, and 3, the separators are positioned between the plurality of first to fourth electrode plates 1211, 1212, 1213, and 1214 to prevent a short circuit between the plurality of first to fourth electrode plates 1211, 1212, 1213, and 1214. The separators may be made of polyethylene, polypropylene, a composite material thereof, or the like.

Referring to FIGS. 1, 2, and 3, the plurality of first electrode plates 1211 and the plurality of third electrode plates 1213 may be alternately arranged. For example, each of the plurality of third electrode plates 1213 may be placed between every two adjacent ones of the plurality of first electrode plates 1211. Each of the plurality of first electrode plates 1211 may be placed between every two adjacent ones of the plurality of third electrode plates 1213. The plurality of first electrode plates 1211 and the plurality of third electrode plates 1213 may be alternately stacked in the thickness dimension (e.g., the +Y direction). The electrode assembly 1200 may include a first stack portion 1205 in which the plurality of first electrode plates 1211 and the plurality of third electrode plates 1213 are alternately arranged. The first stack portion 1205 may be a portion of the electrode assembly 1200. For example, the first stack portion 1205 may form approximately one half of the thickness of the electrode assembly 1200. The plurality of first electrode plates 1211 and the plurality of third electrode plates 1213 may be located in the first stack portion 1205.

Referring to FIGS. 1, 2, and 3, the plurality of second electrode plates 1212 and the plurality of fourth electrode plates 1214 may be alternately arranged. For example, each of the plurality of fourth electrode plates 1214 may be placed between every two adjacent ones of the plurality of second electrode plates 1212. Each of the plurality of second electrode plates 1212 may be placed between every two adjacent ones of the plurality of fourth electrode plates 1214. The plurality of second electrode plates 1212 and the plurality of fourth electrode plates 1214 may be alternately stacked in the thickness dimension (e.g., the +Y direction).

The electrode assembly 1200 may include a second stack portion 1206 in which the plurality of second electrode plates 1212 and the plurality of fourth electrode plates 1214 are alternately arranged. The second stack portion 1206 may be a portion of the electrode assembly 1200. For example, the second stack portion 1206 may form approximately one half of the thickness of the electrode assembly 1200, such that the second stack portion 1206 combined with the first stack portion 1205 form the entire electrode assembly 1200. The plurality of second electrode plates 1212 and the plurality of fourth electrode plates 1214 may be located in the second stack portion 1206.

Referring to FIGS. 1, 2, and 3, the first stack portion 1205 and the second stack portion 1206 may be stacked on each other. The electrode assembly 1200 may be a structure formed by stacking the first stack portion 1205 and the second stack portion 1206.

Referring to FIGS. 1, 2, and 3, each of the first stack portion 1205 and the second stack portion 1206 may form a portion of the electrode assembly 1200. For example, the first stack portion 1205 may correspond to a portion of the electrode assembly 1200 located on one side (e.g., corresponding to the −Y direction) with respect to an imaginary plane P4 that crosses the electrode assembly 1200 in a direction perpendicular to the thickness dimension (e.g., the +Y direction) of the electrode assembly 1200. The second stack portion 1206 may correspond to a remaining portion of the electrode assembly 1200 located on a remaining side (e.g., corresponding to the +Y direction) with respect to the plane P4.

Referring to FIGS. 1, 2, and 3, the first stack portion 1205 may be formed by placing separators between the plurality of first electrode plates 1211 and the plurality of third electrode plates 1213 that are alternately arranged. The second stack portion 1206 may be formed by placing separators between the plurality of second electrode plates 1212 and the plurality of fourth electrode plates 1214 that are alternately arranged. In other aspects of the present disclosure, the electrode portion may be formed by sequentially stacking the first electrode plate 1211, the separator, the third electrode plate 1213, the separator, the second electrode plate 1212, the separator, the fourth electrode plate 1214, and the separator in the listed order, and then winding the stacked structure.

Although, in the present aspect, the electrode assembly 1200 is illustrated as including the single electrode portion 1210, in other aspects, the electrode assembly 1200 may include a plurality of electrode portions 1210. The plurality of electrode portions 1210 may be electrically connected to one another.

Referring to FIGS. 1, 2, and 3, the plurality of first to fourth electrode plates 1211, 1212, 1213, and 1214 may respectively include the electrode tabs 1220, 1230, 1240, and 1250, to which no active material is applied. Each of the electrode tabs 1220, 1230, 1240, and 1250 may be at least a portion of an uncoated portion formed on a corresponding one of the plurality of first to fourth electrode plates 1211, 1212, 1213, and 1214. In an aspect, each of the electrode plates 1211, 1212, 1213, and 1214 and the corresponding electrode tab 1220, 1230, 1240, or 1250 may be integrally formed by cutting a predetermined portion of a single metal plate using a laser or the like, such that the electrode plate 1211, 1212, 1213, or 1214 and the electrode tab 1220, 1230, 1240, or 1250 remain. The plurality of electrode tabs 1220, 1230, 1240, and 1250 may be formed in a direction toward the cap assembly 1400.

Referring to FIGS. 1 and 2, the cap assembly 1400 may seal the opening of the casing 1100 in which the electrode assembly 1200 is accommodated. The cap assembly 1400 may include a cap plate 1410 and terminals 1420 and 1420*a*. The terminals 1420 and 1420*a* may connect the electrode assembly 1200 to an external device.

Referring to FIGS. 1 and 2, the cap plate 1410 may have a plate shape that covers the opening of the casing 1100. The cap plate 1410 may have a shape corresponding to that of the opening of the casing 1100. The cap plate 1410 may be formed of the same material as the casing 1100, and may be fixed to the casing 1100 by a method such as laser welding.

Referring to FIGS. 1 and 2, the cap plate 1410 may be formed with a vent hole 1411 and an electrolyte injection hole 1412. The vent hole 1411 may open when an internal pressure of the casing 1100 exceeds a reference or threshold value. In the present aspect, the vent hole 1411 is formed in the cap plate 1410, but in other aspects, the vent hole 1411 may be formed in the casing 1100. Electrolyte may be injected into the casing 1100 through the electrolyte injection hole 1412.

Referring to FIGS. 1 and 2, the terminals 1420 and 1420*a* may be formed to protrude from the cap plate 1410. The terminals 1420 and 1420*a* may be electrically connected to the electrode tabs 1220, 1230, 1240 and 1250 through the current collectors 1300. The terminals 1420 and 1420*a* may each have a plate shape in a circular or rectangular form.

Referring to FIGS. 1 and 2, a through hole may be formed in each of the terminals 1420 and 1420*a*. Each current collecting protrusion 1331 may be inserted into and positioned in the corresponding through hole. After the current collecting protrusion 1331 is inserted into the through hole, an outer circumferential surface of an end of the current collecting protrusion 1331 and an inner circumferential surface of an end of the through hole may be welded. Insulators may be placed between the terminals 1420 and 1420*a* and the cap plate 1410. The insulators may electrically insulate the terminals 1420 and 1420*a* and the cap plate 1410 from each other.

Referring to FIG. 3, the electrode assembly 1200 may include a plurality of regions 1201, 1202, 1203, and 1204. It should be appreciated that the plurality of regions 1201, 1202, 1203, 1204 are identified for ease of description, and that such regions may not indicate separation therebetween as indicated by dotted lines in FIG. 3. The plurality of regions 1201, 1202, 1203, and 1204 may be arranged in the longitudinal dimension (e.g., the +X direction) of the electrode assembly 1200. Each of the plurality of regions 1201, 1202, 1203, and 1204 may form a portion of the electrode assembly 1200. The plurality of regions 1201, 1202, 1203, and 1204 may be sectioned from one another by a plurality of planes P1, P2, and P3 perpendicular to the longitudinal dimension (+X direction) of the electrode assembly 1200. The plurality of planes P1, P2, and P3 may be imaginary planes spaced apart from one another in the longitudinal dimension (+X direction) of the electrode assembly 1200, and may section the electrode assembly 1200 into the plurality of regions 1201, 1202, 1203, and 1204. For example, the first plane P1 may section the electrode assembly 1200 at a boundary between the first region 1201 and the second region 1202. For example, the second plane P2 may section the electrode assembly 1200 at a boundary between the second region 1202 and the third region 1203. For example, the third plane P3 may section the electrode assembly 1200 at a boundary between the third region 1203 and the fourth region 1204.

Referring to FIG. 3, the first, second, third, and fourth electrode tabs 1220, 1230, 1240, and 1250 may be respectively located in different regions of the electrode assembly 1200. The first electrode tab 1220 may be located in the first region 1201. The second electrode tab 1230 may be located in the second region 1202. The third electrode tab 1240 may be located in the third region 1203. The fourth electrode tab 1250 may be located in the fourth region 1204. In other words, the first, second, third, and fourth electrode tabs 1220, 1230, 1240, and 1250 may be respectively located in the different regions 1201, 1202, 1203, and 1204 sectioned from one another along the longitudinal dimension (e.g., the +X direction) of the electrode assembly 1200.

Figure 4A:
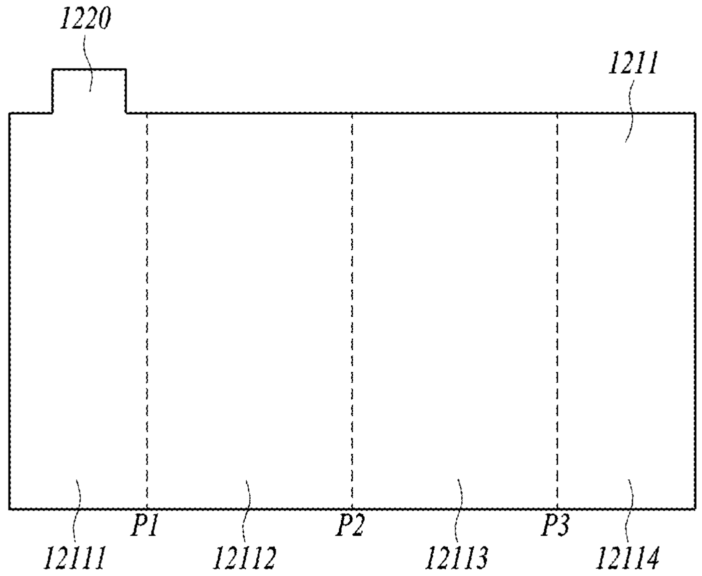
FIGS. 4A and 4B are views illustrating a first electrode plate and a second electrode plate, respectively, in the secondary battery according to an aspect of the present disclosure.

Referring to FIGS. 3 and 4A, the first electrode plate 1211 may include a plurality of first electrode portions 12111, 12112, 12113, and 12114. The plurality of first electrode portions 12111, 12112, 12113, and 12114 may be sectioned from one another by the plurality of planes P1, P2, and P3 spaced apart from one another in the longitudinal dimension (e.g., the +X direction) of the electrode assembly 1200. The first electrode plate 1211 may include a first-1 electrode portion 12111 located in the first region 1201. The first electrode plate 1211 may include a first-2 electrode portion 12112 located in the second region 1202. The first electrode plate 1211 may include a first-3 electrode portion 12113 located in the third region 1203. The first electrode plate 1211 may include a first-4 electrode portion 12114 located in the fourth region 1204. The first electrode tab 1220 may be formed on the first-1 electrode portion 12111 of the first electrode plate 1211.

Figure 4B:
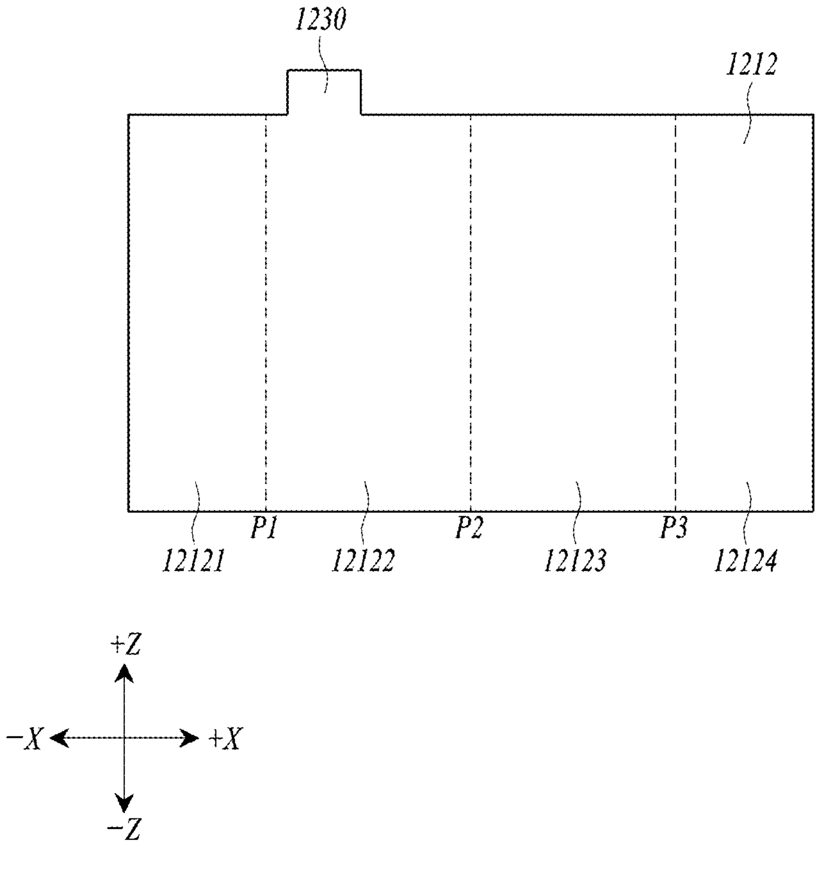

Referring to FIGS. 3 and 4B, the second electrode plate 1212 may include a plurality of second electrode portions 12121, 12122, 12123, and 12124. The plurality of second electrode portions 12121, 12122, 12123, and 12124 may be sectioned by the plurality of planes P1, P2, and P3, which are spaced apart from one another in the longitudinal dimension (e.g., the +X direction) of the electrode assembly 1200. The second electrode plate 1212 may include a second-1 electrode portion 12121 located in the first region 1201. The second electrode plate 1212 may include a second-2 electrode portion 12122 located in the second region 1202. The second electrode plate 1212 may include a second-3 electrode portion 12123 located in the third region 1203. The second electrode plate 1212 may include a second-4 electrode portion 12124 located in the fourth region 1204. The second electrode tab 1230 may be formed on the second-2 electrode portion 12122 of the second electrode plate 1212.

Figure 5A:
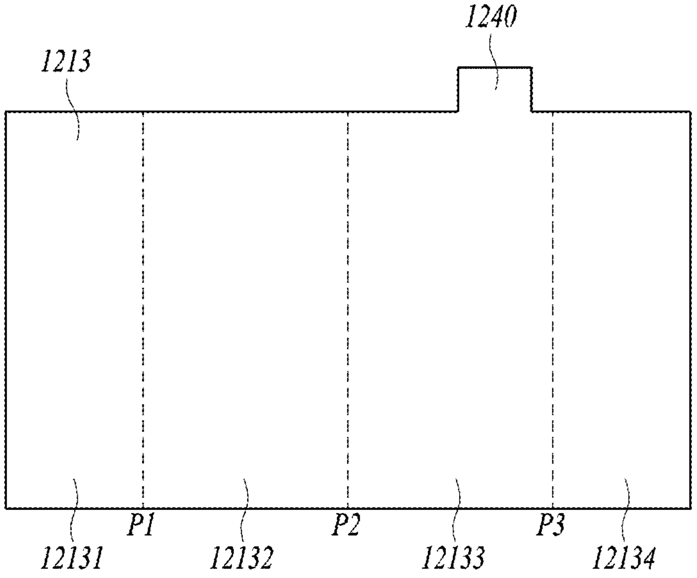
FIGS. 5A and 5B are views illustrating a third electrode plate and a fourth electrode plate, respectively, in the secondary battery according to an aspect of the present disclosure.

Referring to FIGS. 3 and 5A, the third electrode plate 1213 may include a plurality of third electrode portions 12131, 12132, 12133, and 12134. The plurality of third electrode portions 12131, 12132, 12133, and 12134 may be sectioned by the plurality of planes P1, P2, and P3, which are spaced apart from one another in the longitudinal dimension (e.g., the +X direction) of the electrode assembly 1200. The third electrode plate 1213 may include a third-1 electrode portion 12131 located in the first region 1201. The third electrode plate 1213 may include a third-2 electrode portion 12132 located in the second region 1202. The third electrode plate 1213 may include a third-3 electrode portion 12133 located in the third region 1203. The third electrode plate 1213 may include a third-4 electrode portion 12134 located in the fourth region 1204. The third electrode tab 1240 may be formed on the third-3 electrode portion 12133 of the third electrode plate 1213.

Figure 5B:
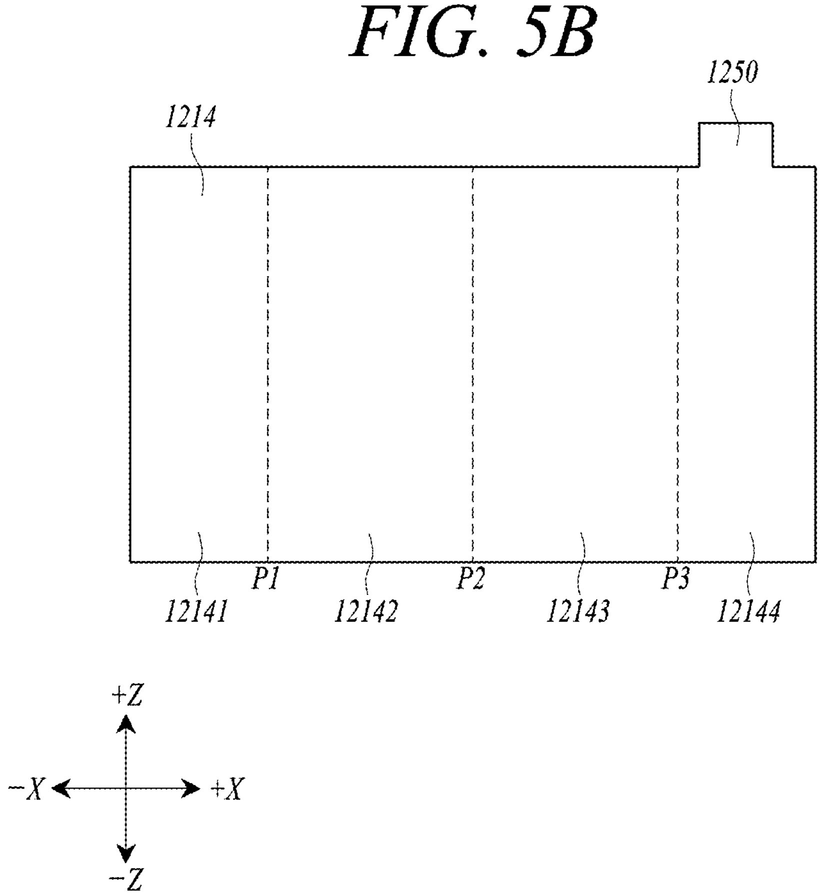

Referring to FIGS. 3 and 5B, the fourth electrode plate 1214 may include a plurality of fourth electrode portions 12141, 12142, 12143, and 12144. The plurality of fourth electrode portions 12141, 12142, 12143, and 12144 may be sectioned by the plurality of planes P1, P2, and P3, which are spaced apart from one another in the longitudinal dimension (e.g., the +X direction) of the electrode assembly 1200. The fourth electrode plate 1214 may include a fourth-1 electrode portion 12141 located in the first region 1201. The fourth electrode plate 1214 may include a fourth-2 electrode portion 12142 located in the second region 1202. The fourth electrode plate 1214 may include a fourth-3 electrode portion 12143 located in the third region 1203. The fourth electrode plate 1214 may include a fourth-4 electrode portion 12144 located in the fourth region 1204. The fourth electrode tab 1250 may be formed on the fourth-4 electrode portion 12144 of the fourth electrode plate 1214.

Referring to FIGS. 3, 4A-4B, and 5A-5B, the plurality of first electrode plates 1211 and the plurality of third electrode plates 1213 may be alternately stacked with the corresponding separators interposed between adjacent electrode plates. A stack including the plurality of first electrode plates 1211 and the plurality of third electrode plates 1213 may form approximately one half (e.g., the first stack portion 1205) of the electrode portion 1210.

Referring to FIGS. 3, 4A-4B, and 5A-5B, the plurality of second electrode plates 1212 and the plurality of fourth electrode plates 1214 may be alternately stacked with the corresponding separators interposed between adjacent electrode plates. A stack including the plurality of second electrode plates 1212 and the plurality of fourth electrode plates 1214 may form approximately a remaining half (e.g., the second stack portion 1206) of the electrode portion 1210.

Referring to FIG. 3, the first stack portion 1205 including the plurality of first electrode plates 1211 and the plurality of third electrode plates 1213 and the second stack portion 1206 including the plurality of second electrode plates 1212 and the plurality of fourth electrode plates 1214 may be connected in the thickness dimension (e.g., the +Y direction) of the electrode portion 1210. During formation of the electrode assembly 1200, the plurality of first electrode plates 1211 and the plurality of third electrode plates 1213 may be stacked before stacking the plurality of second electrode plates 1212 and the plurality of fourth electrode plates 1214.

Referring to FIG. 3, the plurality of first electrode tabs 1220 may overlap each other in the first region 1201 of the electrode assembly 1200, e.g., in the thickness or stacking dimension of the electrode portion 1210. The plurality of second electrode tabs 1230 may overlap each other in the second region 1202 of the electrode assembly 1200, e.g., in the thickness or stacking dimension of the electrode portion 1210. In other words, the plurality of first electrode tabs 1220 may be grouped in the first region 1201, and the plurality of second electrode tabs 1230 may be grouped in the second region 1202. The grouped first electrode tabs 1220 and the grouped second electrode tabs 1230 may be respectively located to be spaced apart from each other in the different regions 1201 and 1202 of the electrode assembly 1200. The grouped first electrode tabs 1220 and the grouped second electrode tabs 1230 may be spaced apart from each other in both the thickness dimension (e.g., the +Y direction) and the longitudinal dimension (e.g., the +X direction) of the electrode assembly 1200 such that no plane extending in the thickness dimension or the longitudinal dimension would intersect both any one of the first electrode tabs 1220 and any one of the second electrode tabs 1230.

Referring to FIG. 6, the current collector 1300 may include a first current collecting portion 1310, a second current collecting portion 1320, and a connection portion 1330.

Referring to FIG. 6, the current collector 1300 may have a rectangular shape extending in the longitudinal dimension (e.g., the +X direction in FIG. 3) of the electrode assembly 1200. The current collector 1300 may include the first current collecting portion 1310, the connection portion 1330, and the second current collecting portion 1320 that are sequentially arranged in the longitudinal dimension of the rectangle. The connection portion 1330 may be positioned between the first current collecting portion 1310 and the second current collecting portion 1320. The first current collecting portion 1310, the second current collecting portion 1320, and the connection portion 1330 may be integrally formed. The first current collecting portion 1310 may be a portion of the current collector 1300 that is located on one longitudinal side of the connection portion 1330. The second current collecting portion 1320 may be a portion of the current collector 1300 that is located on a remaining longitudinal side (e.g., opposite the first current collecting portion 1310) of the connection portion 1330.

Figure 6A:
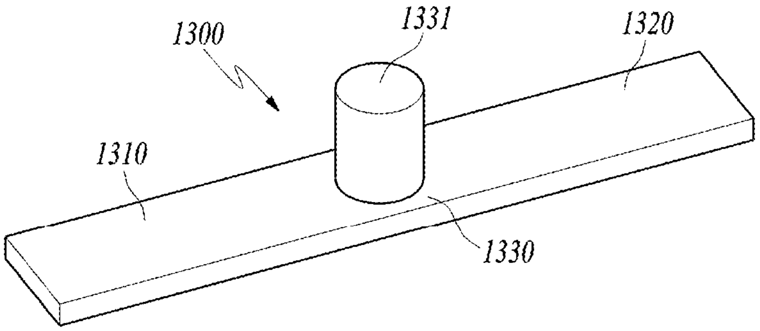
FIGS. 6A and 6B are perspective and side elevation views, respectively, illustrating a current collector in the secondary battery according to an aspect of the present disclosure.
Figure 6B:
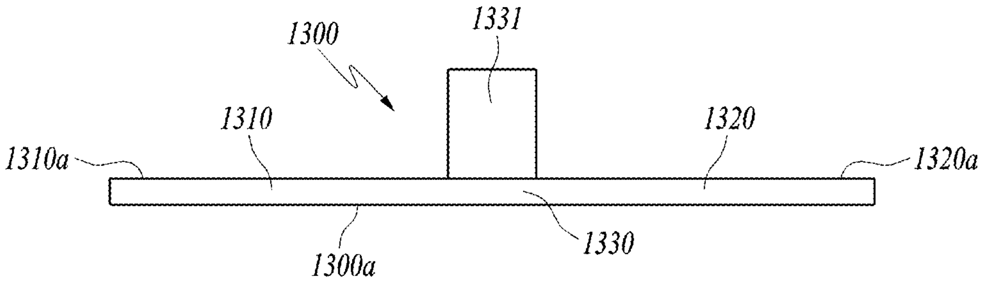

Referring to FIGS. 2 and 6A-6B, the first current collecting portion 1310 may be welded to the plurality of first electrode tabs 1220. The plurality of first electrode tabs 1220 may be bent onto the first current collecting portion 1310 and welded thereto. The second current collecting portion 1320 may be welded to the plurality of second electrode tabs 1230. The plurality of second electrode tabs 1230 may be bent onto the second current collecting portion 1320 and welded thereto. The current collector 1300 may include a lower surface 1300*a* (e.g., a downward facing surface) facing the electrode assembly 1200. The lower surface 1300*a* may be referred to as a "first surface." The current collector 1300 may include upper surfaces 1310*a* and 1320*a* (e.g., upward facing surfaces) to which the plurality of first electrode tabs 1220 and the plurality of second electrode tabs 1230 are respectively welded. The upper surfaces 1310*a* and 1320*a* may be referred to as a "second surface." The upper surfaces 1310*a* and 1320*a* may be opposite to the lower surface 1300*a* that faces the electrode assembly 1200. The upper surfaces 1310*a* and 1320*a* may face the terminals 1420 and 1420*a*. The upper surfaces 1310*a* and 1320*a* may include a first weld surface 1310*a* to which the plurality of first electrode tabs 1220 are welded. The first weld surface 1310*a* may be an upper surface of the first current collecting portion 1310. The upper surfaces 1310*a* and 1320*a* may include a second weld surface 1320*a* to which the plurality of second electrode tabs 1230 are welded. The second weld surface 1320*a* may be an upper surface of a second current collecting portion 1320. The plurality of first electrode tabs 1220, for example, may be bent such that the tabs extend approximately parallel or more closely to being parallel to the plane along which the upper surfaces 1310*a* and 1320*a* extend, so as to increase an amount of surface area for welding between the plurality of first electrode tabs 1220 and the first current collecting portion 1310. That is, in one example, the plurality of first electrode tabs 1220 may initially extend along a plane extending in the height and longitudinal dimensions, and may be bent for welding such that the tabs then extend along a plane extending in the longitudinal and thickness dimensions, or at least more closely thereto.

Referring to FIGS. 2 and 6A-6B, the connection portion 1330 may be located between the first current collecting portion 1310 and the second current collecting portion 1320. The first current collecting portion 1310 and the second current collecting portion 1320 may be respectively connected to the opposite sides of the connection portion 1330. Because the first current collecting portion 1310 and the second current collecting portion 1320 are spaced apart from each other by the connection portion 1330, the plurality of first electrode tabs 1220 and the plurality of second electrode tabs 1230 may not interfere with each other when welded to the first current collecting portion 1310 and the second current collecting portion 1320, respectively.

Referring to FIGS. 2 and 6A-6B, the current collector 1300 may be provided as a pair. The material of each of the current collectors 1300 may be the same as that of at least one of the first to fourth electrode tabs 1220, 1230, 1240 and 1250. In other words, the current collectors 1300 may be formed of aluminum, or may be formed of copper or nickel. The foregoing description pertaining to welding of the first and second electrode tabs 1220 and 1230 to the current collector 1300 may be applied in the same manner to welding of the third and fourth electrode tabs 1240 and 1250 to the current collector 1300. For example, the third electrode tabs 1240 may be welded to the first weld surface 1310*a* of the first current collecting portion 1310, and the fourth electrode tabs 1250 may be welded to the second weld surface 1320*a* of the second current collecting portion 1320.

Referring to FIGS. 2 and 6A-6B, the current collector 1300 may include the current collecting protrusion 1331. The current collecting protrusion 1331 may be electrically coupled to a corresponding electrode terminal. The current collecting protrusion 1331 may be formed to protrude from the connection portion 1330. The current collecting protrusion 1331 may be disposed between the first current collecting portion 1310 and the second current collecting portion 1320. A material of the current collecting protrusion 1331 may be identical to or different from that of the connection portion 1330. For example, both the connection portion 1330 and the current collecting protrusion 1331 may be formed of aluminum. Alternatively, the connection portion 1330 may be formed of copper, and the current collecting protrusion 1331 may be formed of aluminum. In the case where the material of the current collecting protrusion 1331 is identical to that of the connection portion 1330, the connection portion 1330 and the current collecting protrusion 1331 may be integrally formed.

Referring to FIGS. 2 and 6A-6B, the current collector 1300 may have a thickness ranging from 0.5 mm to 3.0 mm. A width of the current collector 1300 in the stacking dimension of the electrode assembly may be 0.5 to 0.8 times the thickness of the electrode assembly 1200 along that dimension. The current collector 1300 may be located on the electrode assembly 1200. The electrode tabs 1220, 1230, 1240, and 1250 may be located on the upper surfaces 1310*a* and 1320*a* of the current collector 1300, and may be welded on the upper surfaces 1310*a* and 1320*a* of the current collector 1300. In the related art, because the current collector is placed on the electrode tabs and welding is performed, even a lower portion of the current collector that is in contact with the electrode tabs is required to be melted, and thus the thickness of the current collector cannot be increased. In the secondary battery 1000 according to an aspect of the present disclosure, the electrode tabs 1220, 1230, 1240, and 1250 may be welded on the upper surfaces 1310*a* and 1320*a* of the current collector 1300. Therefore, it is not necessary to melt the lower portion of the current collector 1300 during a welding process, and the thickness of the current collector 1300 may be increased, thereby improving the durability of the secondary battery. Furthermore, in the related art, because welding is performed after placing the current collector on the electrode tabs, high laser output is required to transmit heat to the electrode tabs located under the current collector. However, in the secondary battery 1000 according to an aspect of the present disclosure, the electrode tabs 1220, 1230, 1240, and 1250 may be welded on the upper surfaces 1310*a* and 1320*a* of the current collector 1300, thereby enabling welding with relatively low output.

Referring to FIGS. 2 and 6A-6B, in the secondary battery 1000 according to an aspect of the present disclosure, because the electrode tabs 1220, 1230, 1240, and 1250 are welded on the upper surfaces 1310*a* and 1320*a* of the current collector 1300, which do not face the electrode assembly 1200, sparks or foreign substances generated during the welding process may be prevented from penetrating into the electrode assembly 1200. Accordingly, damage to the separators can be reduced.

Figure 7:
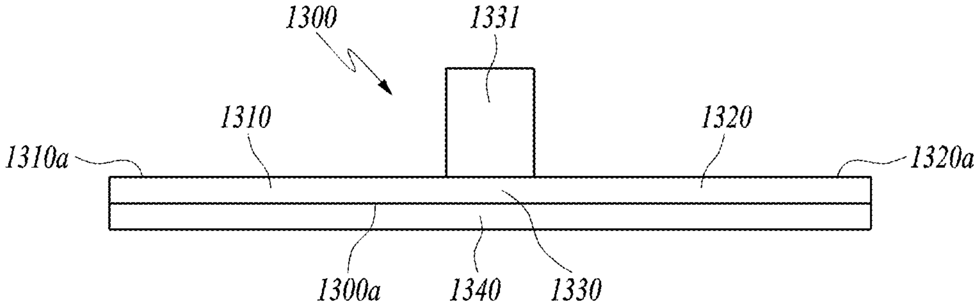
FIG. 7 is a side elevation view illustrating a current collector with protective layer in the secondary battery according to an aspect of the present disclosure.

Referring to FIGS. 2 and 7, a protective layer 1340 may be disposed under the current collector 1300. The protective layer 1340 may be disposed on or adjacent the lower surface 1300*a* of the current collector 1300. The protective layer 1340 may be an insulating plate or an insulating film. The protective layer 1340 may protect the current collector 1300, the electrode tabs 1220, 1230, 1240, and 1250, and the electrode assembly 1200. For example, the protective layer 1340 may be provided such that the electrode tabs 1220, 1230, 1240, and 1250 and the current collector 1300 are placed on one side of the protective layer 1340, and the electrode portion (e.g., the electrode portion 1210 of FIG. 3) of the electrode assembly 1200 is placed on a remaining side of the protective layer 1340, thereby electrically insulating the electrode portion 1210 from the current collector 1300 and preventing electrical interference among the electrode tabs 1220, 1230, 1240, and 1250, the current collector 1300, and the electrode portion 1210. A method of assembling the first electrode tab 1220, the second electrode tab 1230, the current collector 1300, and the terminal 1420, which is described with reference to FIGS. 8 to 13, may also be equally applied to a method of assembling the third electrode tab 1240, the fourth electrode tab 1250, the current collector 1300, and the terminal 1420*a*, as shown in FIG. 2.

Figure 8:
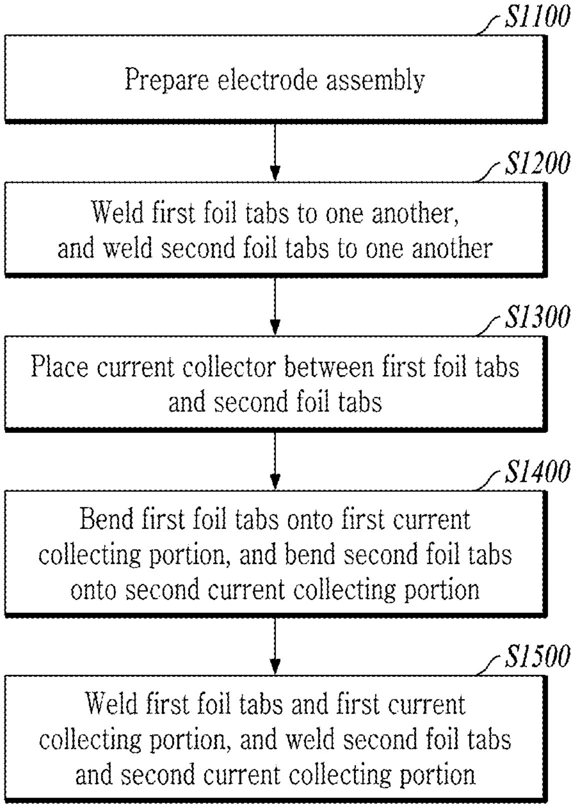
FIG. 8 is a flowchart illustrating a method of manufacturing a secondary battery according to an aspect of the present disclosure.
Figure 9:
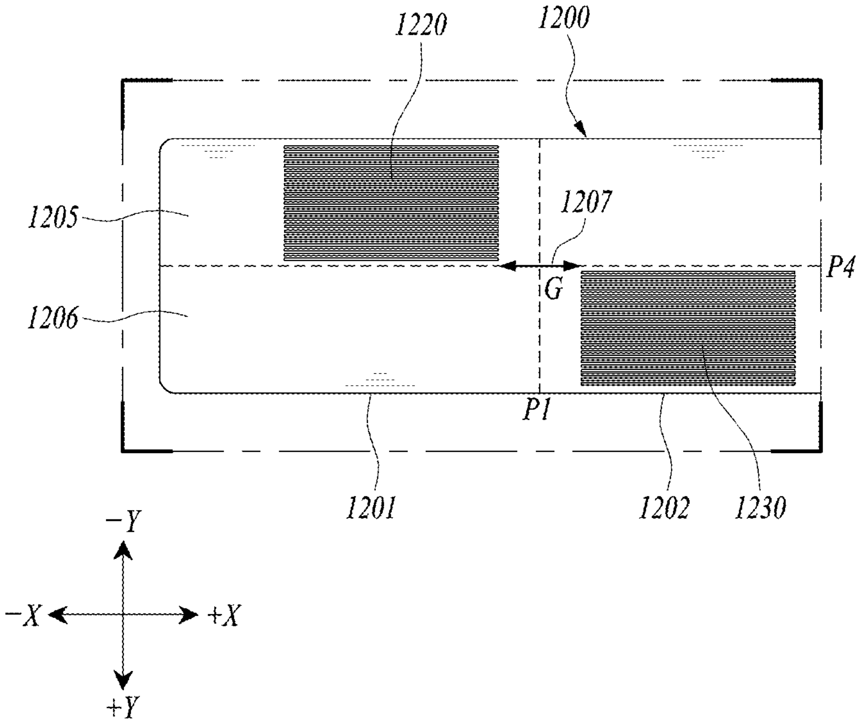
FIG. 9 is a plan view illustrating a plurality of first electrode tabs and a plurality of second electrode tabs that are respectively grouped in the secondary battery according to an aspect of the present disclosure.

Referring to FIGS. 8 and 9, the method of manufacturing the secondary battery according to an aspect of the present disclosure may include step S1100 of preparing the electrode assembly. The electrode assembly 1200 may include the electrode portion 1210, the plurality of first electrode tabs 1220, and the plurality of second electrode tabs 1230.

Referring to FIG. 9, the plurality of first electrode tabs 1220 may be disposed in one region (e.g., the first region 1201) of the electrode assembly 1200. When a plurality of electrode plates (e.g., the plurality of first electrode plates 1211 of FIG. 3) are stacked to form the first stack portion 1205, the plurality of first electrode tabs 1220 may be located to overlap each other in the first region 1201. In other words, the plurality of first electrode tabs 1220 may be grouped in the first region 1201 such that all of the plurality of first electrode tabs 1220 are aligned in the thickness or stacking dimension of the electrode portion 1210.

Referring to FIG. 9, the plurality of second electrode tabs 1230 may be disposed in one region (e.g., the second region 1202) of the electrode assembly 1200. When a plurality of electrode plates (e.g., the plurality of second electrode plates 1212 of FIG. 3) are stacked to form the second stack portion 1206, the plurality of second electrode tabs 1230 may be located to overlap each other in the second region 1202. In other words, the plurality of second electrode tabs 1230 may be grouped in the second region 1202 such that all of the plurality of second electrode tabs 1230 are aligned in the thickness or stacking dimension of the electrode portion 1210.

Referring to FIGS. 4A-4B, 5A-5B, and 9, although only one electrode tab 1220, 1230, 1240, or 1250 is formed on each of the electrode plates 1211, 1212, 1213, or 1214 in the secondary battery 1000 according to an aspect of the present disclosure, two electrode tab groups having different (e.g., offset) positions may be formed on each of the positive and negative electrodes after stacking the electrode plates 1211, 1212, 1213, and 1214, by varying the positions at which the electrode tabs 1220, 1230, 1240, and 1250 are formed on the respective electrode plates 1211, 1212, 1213, and 1214. In other aspects, two or more electrode tabs formed at different positions may be provided on the same polarity side.

Referring to FIG. 9, the grouped plurality of first electrode tabs 1220 may be located in the first region 1201 of the first stack portion 1205. The grouped plurality of second electrode tabs 1230 may be located in the second region 1202 of the second stack portion 1206. The plurality of first electrode tabs 1220 and the plurality of second electrode tabs 1230 may be spaced apart from each other in the longitudinal dimension (e.g., the +X direction) of the electrode assembly 1200. A gap G may be formed between the plurality of first electrode tabs 1220 and the plurality of second electrode tabs 1230, the gap G extending in the longitudinal dimension. The electrode assembly 1200 may include a bridge portion 1207 formed between the plurality of first electrode tabs 1220 and the plurality of second electrode tabs 1230. The bridge portion 1207 may be a portion of the electrode assembly 1200 located between the first electrode tabs 1220 and the second electrode tabs 1230, which are spaced apart in the longitudinal dimension (e.g., the +X direction). The bridge portion 1207 may provide a position at which the current collecting protrusion (e.g., the current collecting protrusion 1331 of FIG. 6) of the current collector (e.g., the current collector 1300 of FIG. 6) protrudes. The connection portion (e.g., the connection portion 1330 of FIG. 6) of the current collector (e.g., the current collector 1300 of FIG. 6) may be disposed to correspond to the bridge portion 1207. The current collecting protrusion (e.g., the current collecting protrusion 1331 of FIG. 6) of the current collector may protrude toward the corresponding terminal (e.g., the terminal 1420 of FIG. 2) at a position corresponding to the bridge portion 1207.

Figure 10A:
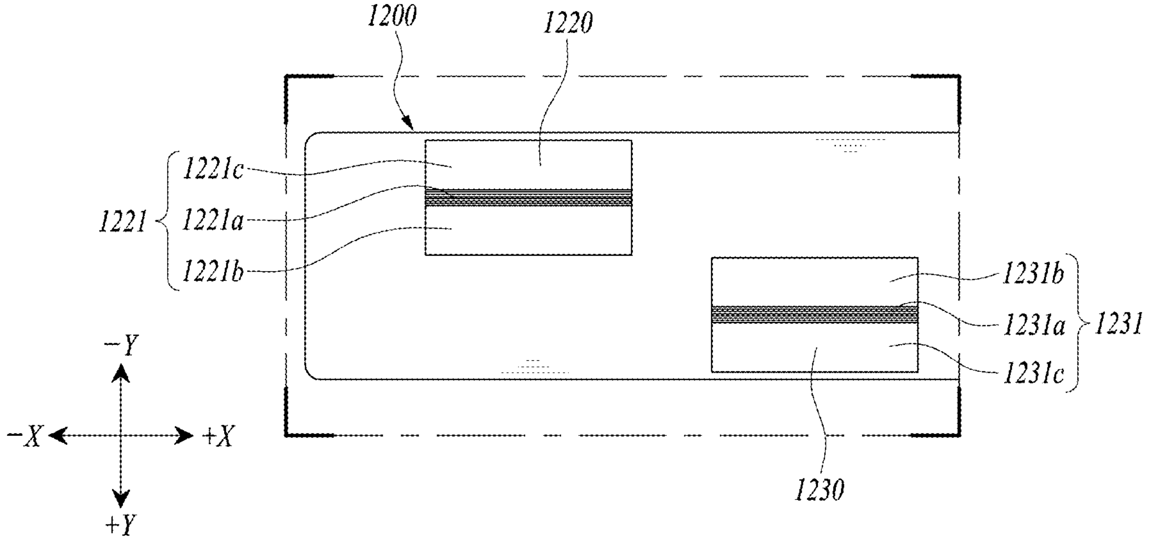
FIGS. 10A and 10B are plan and perspective views, respectively, illustrating the plurality of first electrode tabs and the plurality of second electrode tabs that are subjected to primary welding in the secondary battery according to an aspect of the present disclosure.
Figure 10B:
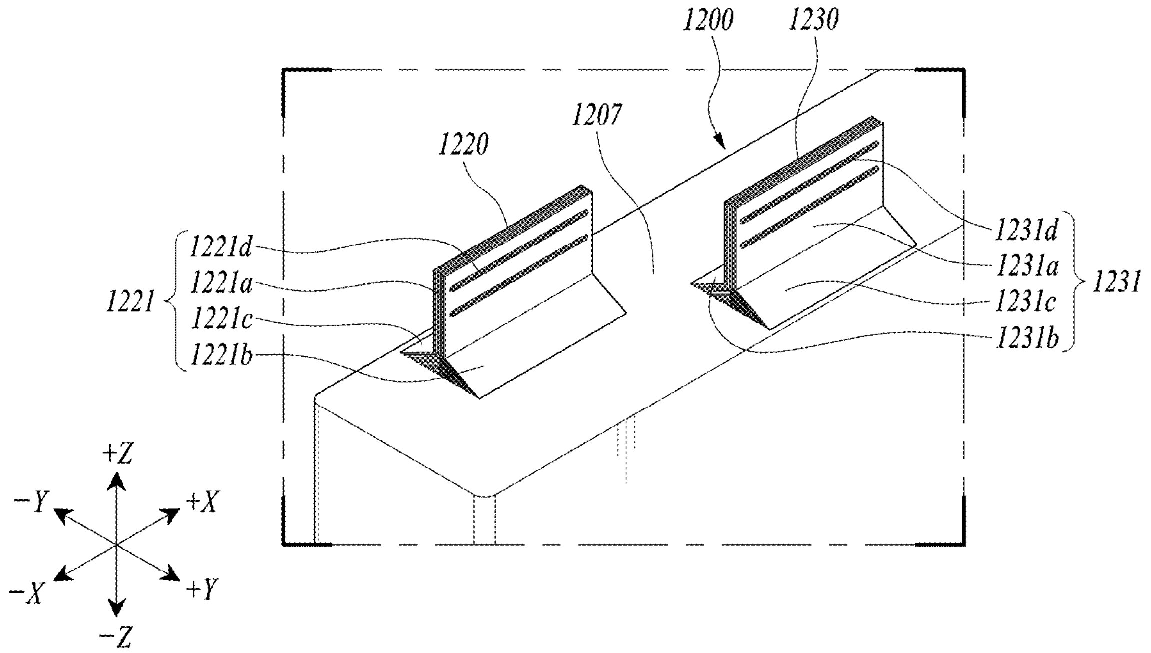

Referring to FIGS. 8 and 10A-10B, a method of manufacturing the secondary battery according to aspects of the present disclosure may include step S1200 of performing primary welding. The grouped plurality of first electrode tabs 1220 may be primarily welded to one another, and the plurality of second electrode tabs 1230 may be primarily welded to one another.

Referring to FIGS. 10A-10B, the plurality of first electrode tabs 1220 and the plurality of second electrode tabs 1230 may be electrode tabs having the same polarity. In order to stably weld a large number of first and second electrode tabs 1220 and 1230, the plurality of first electrode tabs may be primarily welded to one another, and the plurality of second electrode tabs may be primarily welded to one another, and thereafter, the first and second electrode tabs 1220 and 1230 may be secondarily welded on the corresponding current collector (e.g., the current collector 1300 of FIG. 11). The plurality of third electrode tabs (e.g., the third electrode tabs 1240 of FIG. 3) and the plurality of fourth electrode tabs (e.g., the fourth electrode tabs 1250 of FIG. 3) may be electrode tabs having the same polarity (which may be a different polarity than that of the plurality of first electrode tabs and the plurality of second electrode tabs). As in the case of the plurality of first electrode tabs 1220 and the plurality of second electrode tabs 1230, the plurality of third electrode tabs 1240 may be primarily welded to one another, and the plurality of fourth electrode tabs 1250 may be primarily welded to one another, and thereafter, the third and fourth electrode tabs 1240 and 1250 may be secondarily welded on the corresponding current collector 1300. The plurality of electrode tabs 1220, 1230, 1240, and 1250, which overlap at the respective positions, may each be primarily welded by ultrasonic welding, laser welding, or the like to facilitate current flow. The plurality of electrode tabs 1220, 1230, 1240, and 1250 which may be primarily welded, respectively, may each be cut to be the same length. The length may for example be a length as measured from the electrode portion, e.g., a length by which the respective electrode tabs extend and/or protrude from the electrode portion.

Referring to FIGS. 10A-10B, the electrode assembly 1200 may include a first electrode tab assembly 1221. The first electrode tab assembly 1221 may be a structure in which the plurality of first electrode tabs 1220 are welded to each other. In other words, the first electrode tab assembly 1221 may be an assembly or unit formed in which the plurality of first electrode tabs 1220 that overlap each other are primarily welded together.

Referring to FIGS. 10A-10B, the first electrode tab assembly 1221 may include a first-1 assembly portion **1221*a*. The first-1 assembly portion 1221*a* may be a portion or unit formed in which the plurality of first electrode tabs 1220 that overlap each other are welded together. The first electrode tab assembly 1221 may include a first assembly weld portion 1221*d*. The first assembly weld portion 1221*d* may be formed in the first-1 assembly portion 1221*a*. The first electrode tab assembly 1221 may include a first-2 assembly portion 1221*b* and a first-3 assembly portion 1221*c*. The first-2 assembly portion 1221*b* may be a portion extending in one direction (e.g., the +Y direction) from the first-1 assembly portion 1221*a*. The first-3 assembly portion 1221*c* may be a portion extending from the first-1 assembly portion 1221*a* in a direction (e.g., the −Y direction) opposite to the first-2 assembly portion 1221*b*. The first-3 assembly portion 1221*c* may extend in a direction toward the outer side of the electrode assembly 1200, that is, in a direction opposite to the direction toward the second stack portion 1206 with respect to the thickness or stacking dimension of the electrode assembly 1200**.

Referring to FIGS. 10A-10B, the electrode assembly 1200 may include a second electrode tab assembly 1231. The second electrode tab assembly 1231 may be a structure in which the plurality of second electrode tabs 1230 are welded to each other. In other words, the second electrode tab assembly 1231 may be an assembly or unit formed in which the plurality of second electrode tabs 1230 that overlap each other are primarily welded together.

Referring to FIGS. 10A-10B, the second electrode tab assembly 1231 may include a second-1 assembly portion **1231*a*. The second-1 assembly portion 1231*a* may be a portion in which the plurality of second electrode tabs 1230 that overlap each other are welded. The second electrode tab assembly 1231 may include a second assembly weld portion 1231*d*. The second assembly weld portion 1231*d* may be formed in the second-1 assembly portion 1231*a*. The second electrode tab assembly 1231 may include a second-2 assembly portion 1231*b* and a second-3 assembly portion 1231*c*. The second-2 assembly portion 1231*b* may be a portion extending in one direction (e.g., the −Y direction) from the second-1 assembly portion 1231*a*. The second-3 assembly portion 1231*c* may be a portion extending from the second-1 assembly portion 1231*a* in a direction (e.g., the +Y direction) opposite to the second-2 assembly portion 1231*b*. The second-3 assembly portion 1231*c* may extend in a direction toward the outer side of the electrode assembly 1200, that is, in a direction opposite to the direction toward the first stack portion 1205 with respect to the thickness or stacking dimension of the electrode assembly 1200**.

Figure 11A:
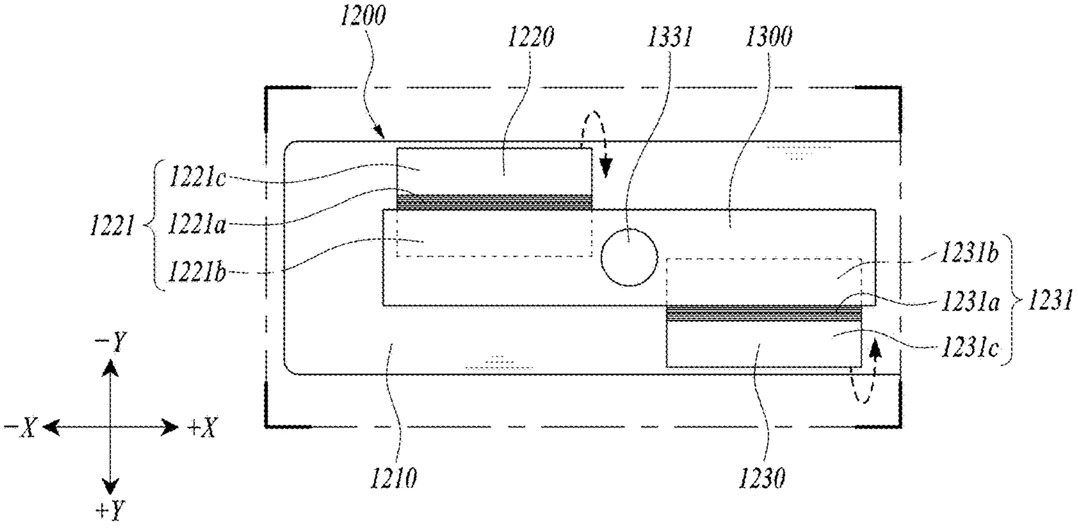
FIGS. 11A-11C are plan views illustrating sequential steps of placing a current collector between the plurality of first electrode tabs and the plurality of second electrode tabs in the secondary battery according to an aspect of the present disclosure.
Figure 11B:
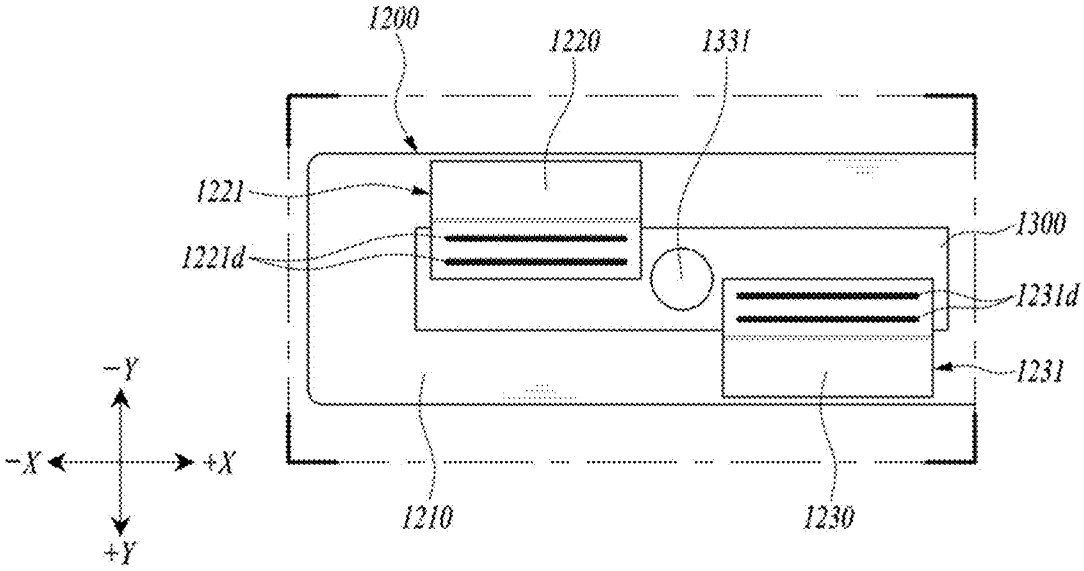

Referring to FIGS. 8 and 11A-11B, the method of manufacturing the secondary battery according to an aspect the present disclosure may include step S1300 of placing the current collector 1300. The current collector 1300 may be placed between the plurality of first electrode tabs 1220 and the plurality of second electrode tabs 1230 that are primarily welded. To connect the plurality of electrode tabs 1220 and 1230 to the current collector 1300, in the present aspect, the electrode tabs 1220 and 1230 having the same polarity are divided into the two electrode tab assemblies 1221 and 1231, and then welded to the current collector 1300. For example, the first electrode tab assembly 1221 may be welded to the first current collecting portion of the current collector 1300 (e.g., the first current collection portion 1310 of FIG. 12), and the second electrode tab assembly 1231 may be welded to the second current collecting portion of the current collector 1300 (e.g., the second current collection portion 1320 of FIG. 12).

Referring to FIGS. 11A-11B, the current collector 1300 may be disposed to cover at least a portion of the first electrode tab assembly 1221 and at least a portion of the second electrode tab assembly 1231. The current collector 1300 may overlap, in the third dimension (e.g., the +Z direction), each of at least a portion of the first electrode tab assembly 1221 and at least a portion of the second electrode tab assembly 1231. For example, the current collector 1300 may be disposed to cover the first-2 assembly portion 1221*b* and the second-2 assembly portion 1231*b*. The first-2 assembly portion 1221*b* may thus be located between the electrode portion 1210 of the electrode assembly 1200 and the current collector 1300. The second-2 assembly portion 1231*b* may thus be located between the electrode portion 1210 of the electrode assembly 1200 and the current collector 1300. The current collecting protrusion 1331 may protrude between the first-2 assembly portion 1221*b* and the second-2 assembly portion 1231*b*. The current collector 1300 may be disposed in space formed between the first electrode tab assembly 1221 and the second electrode tab assembly 1231. To facilitate placement of the current collector 1300, each of the first electrode tab assembly 1221 and the second electrode tab assembly 1231 may be temporarily bent toward a respective outer side of the electrode assembly 1200.

Referring to FIG. 11B, the sum of the areas of the first-1 assembly part 1221*a* and the second-1 assembly part 1231*a* that are bent and placed on the plate of the current collector 1300 may have a predetermined ratio with respect to the area of the upper surface of the plate of the current collector 1300. For example, the sum of the area of the first-1 assembly part 1221*a* and the second assembly part 1231*a* may be approximately ⅙ to ¼ of the total area of the upper surface of the plate of the current collector 1300. By securing a predetermined area in which the first and second electrode tabs are in contact with the plate of the current collector 1300, the flow of current may be improved and optimized.

It should be noted that the area of the first-1 assembly part 1221*a* and the second-1 assembly part 1231*a* that are bent and placed on the plate of the current collector 1300 may preferably be approximately ⅙ to ¼ of the total area of the plate of the current collector 1300 for various nonexclusive reasons as will now be discussed. If the tab area on the plate of the current collector 1300 is excessively narrow, it may be difficult for the tab to sufficiently bond with the plate of the current collector 1300. Thus, it may be preferable that the tab area be at least ⅙ of the area of the plate of the current collector 1300.

Furthermore, if a large number of tabs are placed on the plate of the current collector 1300, the amount of tab melting during the main welding process may increase, leading to uneven weld bead heights. This may cause problems during cap plate assembly. Therefore, it may be preferred that the tab area be less than ¼ of the plate of the current collector 1300.

Figure 11C:
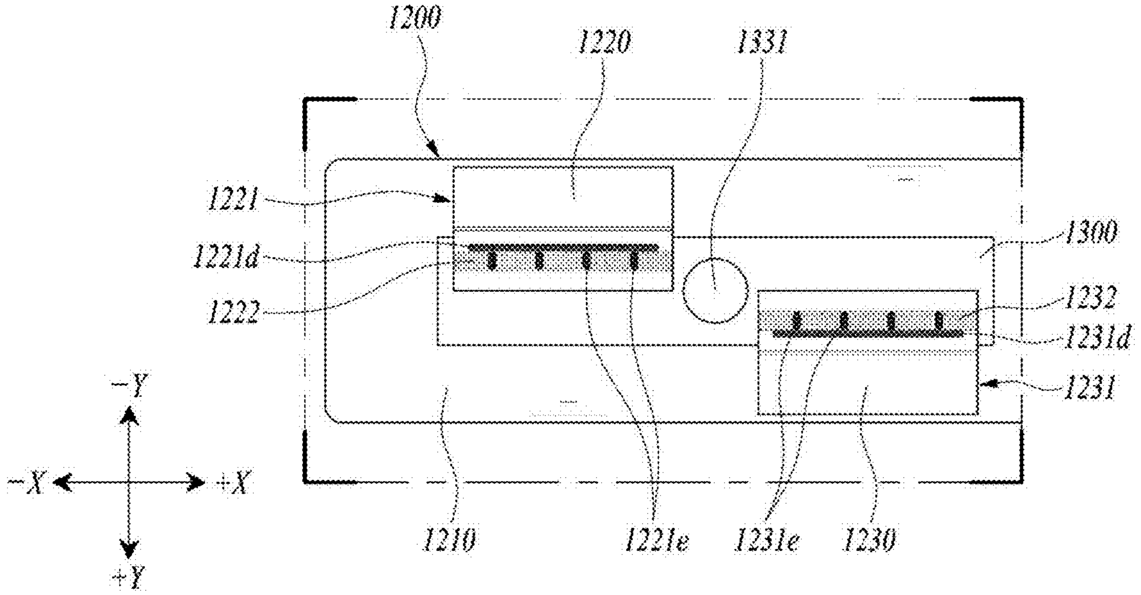

Referring to FIG. 11C, the area of the secondary welding region 1222 formed on the first and second electrode tabs may have a predetermined ratio with respect to the area of the first and second electrode tabs 1221*a*, 1231*a* bent and placed on the current collector 1300. For example, the area of the secondary welding region formed on the first and second electrode tabs may be ⅐ to ⅕ of the area of the first and second electrode tabs 1221*a*, 1231*a* bent and placed on the current collector plate, respectively. By securing the area where the first and second electrode tabs are welded, the flow of current can be enhanced or optimized.

It should be noted that the area of the secondary welding region 1222 formed on the first and second electrode tabs may preferably be ⅐ to ⅕ of the area of the first and second electrode tabs 1221*a*, 1231*a* bent over the current collector plate, respectively, for various nonexclusive reasons as will now be discussed. First, a relatively narrow secondary welding zone area may increase electrical resistance, thereby leading to increased heat generation. Furthermore, the weld joint strength may weaken, potentially leading to separation between the tab and the current collector plate. Therefore, a secondary welding zone area of at least ⅐ of the current collector plate area is preferred.

Conversely, a relatively larger secondary welding zone area reduces electrical resistance and improves current flow between the electrode tab and the external circuit. However, if the welding area is too large, the benefit of improved current flow may be offset by increased welding time, which may negatively impact manufacturing efficiency.

Furthermore, a relatively larger secondary welding area may lead to heat being transferred being transferred beyond the current collector plate during the welding process, potentially damaging the separator. Therefore, a secondary welding area of less than ⅕ of the current collector plate area is preferred.

Figure 12A:
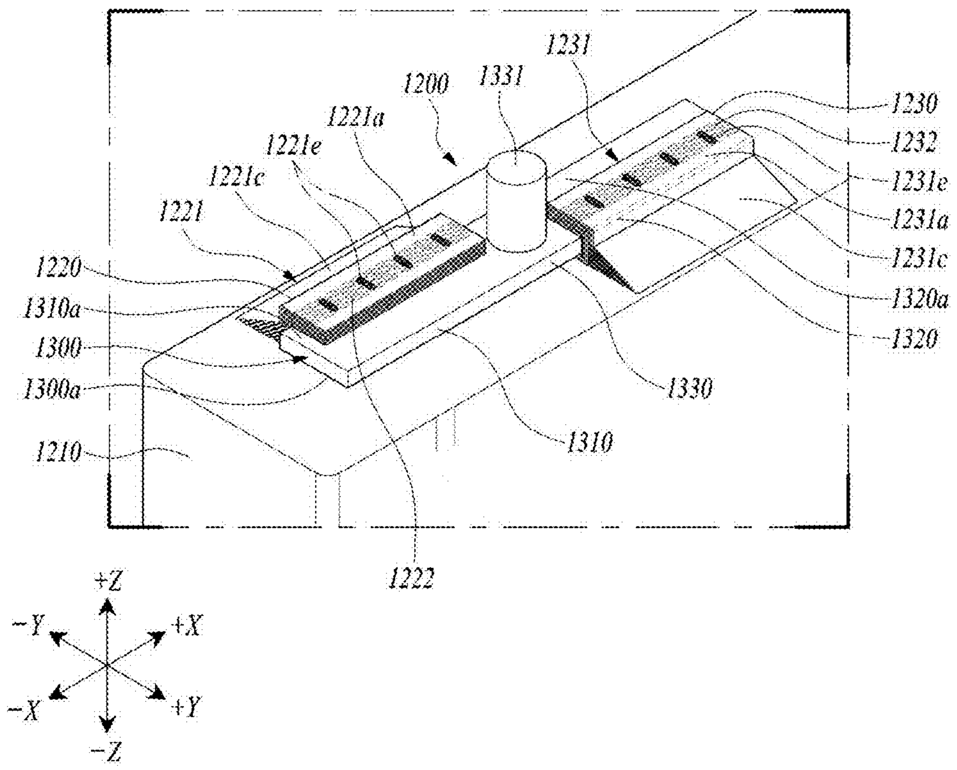
FIG. 12A is a perspective view illustrating the current collector and the first and second electrode tabs welded together in the secondary battery according to an aspect of the present disclosure.
Figure 12B:
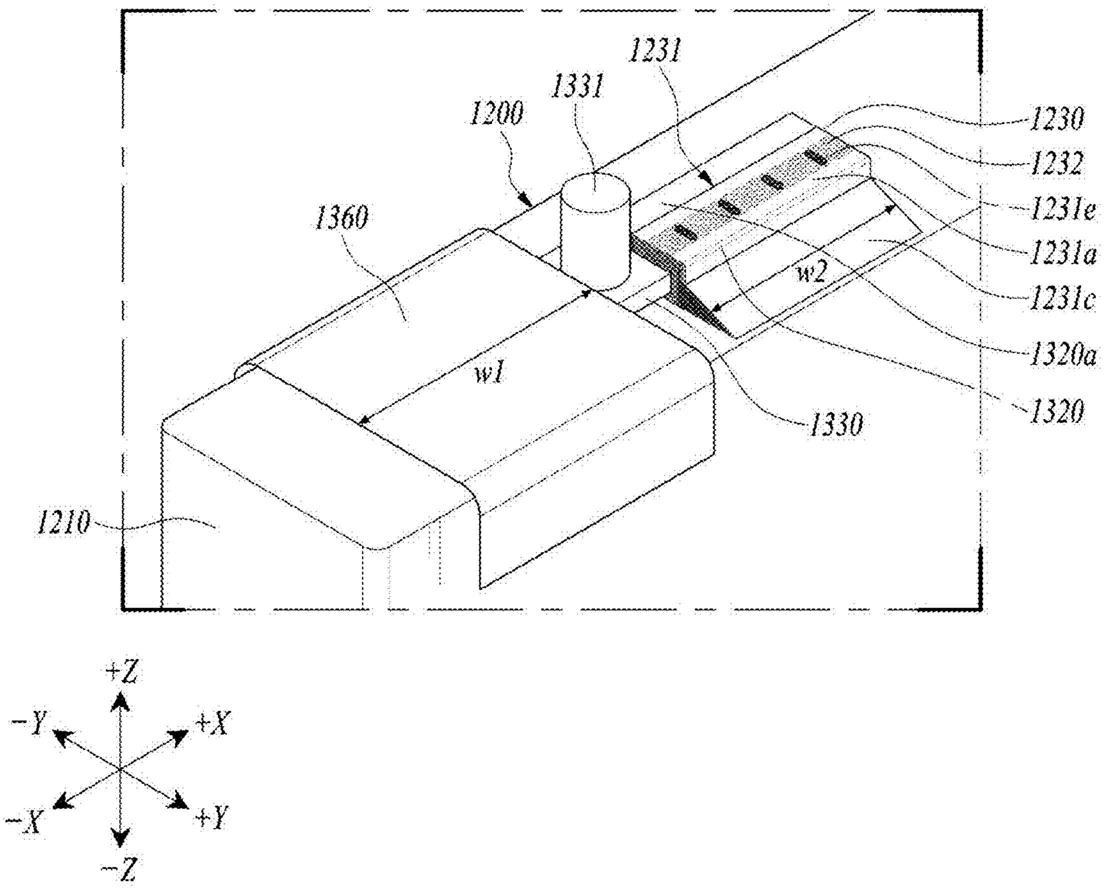
FIG. 12B is a perspective view illustrating the welded current collector of FIG. 12A covered by a cover.

Referring to FIG. 12B, after completion of the secondary welding, a cover member 1360 may be placed on the plate of the current collector 1300. The cover member 1360 may cover at least a portion of the electrode assembly 1200. The cover member 1360 may include an insulating material. The collector edge 1231 and the collector projection 1331 may be exposed outside of cover member 1360. The terminal 1420, 1420*a* may be coupled with the collector projection 1331 exposed on the outside of the cover member 1360. The width w1 of the cover member 1360 may preferably be approximately 1 to 1.2 times the width w2 of the first and second electrode tabs, which would allow an entirety of the weld area to be covered while minimizing an amount of material used and minimizing the amount of space necessary to cover the entire weld area.

Referring to FIGS. 8, 11A-11B, and 12A, the method of manufacturing the secondary battery according to the present disclosure may include step S1400 of bending the first electrode tabs 1220 and the second electrode tabs 1230 toward the upper surfaces 1310*a* and 1320*a* of the current collector 1300, respectively. The plurality of first electrode tabs 1220 may be bent toward the upper surface 1310*a* of the first current collecting portion 1310 of the current collector 1300 such that at least a portion of the plurality of first electrode tabs 1220 extends along a plane approximately parallel to a plane along which the upper surface 1310*a* extends. The plurality of second electrode tabs 1230 may be bent toward the upper surface 1320*a* of the second current collecting portion 1320 of the current collector 1300 such that at least a portion of the plurality of second electrode tabs 1230 extends along a plane approximately parallel to a plane along which the upper surface 1320*a* extends. The plurality of first electrode tabs 1220 and the plurality of second electrode tabs 1230 may be bent in opposite directions.

Referring to FIGS. 8, 11A-11B, and 12, the first electrode tab assembly 1221 may be bent onto the first weld surface 1310*a* of the first current collecting portion 1310. The first-1 assembly portion 1221*a* may be bent onto the first weld surface 1310*a*. The first-1 assembly portion 1221*a* may be bent toward the second stack portion (e.g., the second stack portion 1206 in FIG. 3). In this case, the first-2 assembly portion 1221*b* may be positioned between the lower surface 1300*a* of the current collector 1300 and the electrode portion 1210 of the electrode assembly 1200, so that the bending of the first-1 assembly portion 1221*a* may be supported by the first-2 assembly portion 1221*b* pressed by the current collector 1300. The first-3 assembly portion 1221*c* may extend in a direction away from the current collector 1300 from the first-1 assembly portion 1221*a*, thereby providing structural stability to the first electrode tab assembly 1221. For example, the first-3 assembly portion 1221*c* may have a structure that spreads widely in the thickness or stacking dimension (e.g., the −Y direction) of the first-1 assembly portion 1221*a* during the process of bending and welding the first-1 assembly portion 1221*a*, so as to disperse stress applied in the thickness dimension to the first-1 assembly portion 1221*a*.

Referring to FIGS. 8, 11A-11B, and 12, the second electrode tab assembly 1231 may be bent onto the second weld surface 1320*a* of the second current collecting portion 1320. The second-1 assembly portion 1231*a* may be bent onto the second weld surface 1320*a*. The second-1 assembly portion 1231*a* may be bent toward the first stack portion (e.g., the first stack portion 1205 of FIG. 3). In this case, the second-2 assembly portion 1231*b* may be positioned between the lower surface 1300*a* of the current collector 1300 and the electrode portion 1210 of the electrode assembly 1200, so that the bending of the second-1 assembly portion 1231*a* may be supported by the second-2 assembly portion 1231*b* pressed by the current collector 1300. The second-3 assembly portion 1231*c* may extend in a direction away from the current collector 1300 from the second-1 assembly portion 1231*a*, thereby providing structural stability of the second electrode tab assembly 1231. For example, the second-3 assembly portion 1231*c* may have a structure that spreads widely in the thickness or stacking dimension (e.g., the +Y direction) of the second-1 assembly portion 1231*a* during the process of bending and welding the second-1 assembly portion 1231*a*, so as to disperse stress applied in the thickness dimension to the second-1 assembly portion 1231*a*.

Referring to FIGS. 11A-11B and 12, the first-2 assembly portion 1221*b* may be located between a first collector weld portion 1221*e* and the electrode portion 1210 of the electrode assembly 1200. The second-2 assembly portion 1231*b* may be located between the second collector weld portion 1231*e* and the electrode portion 1210 of the electrode assembly 1200. The first current collecting portion 1310 may be located between the first collector weld portion 1221*e* and the first-2 assembly portion 1221*b*. The second current collecting portion 1320 may be located between a second collector weld portion 1231*e* and the second-2 assembly portion 1231*b*. Due structure, to the above-described foreign substances generated during welding of the first-1 and second-1 assembly portions 1221*a* and 1231*a* to the current collector 1300 may be blocked by the first-2 and second-2 assembly portions 1221*b* and 1231*b* and thus may be prevented from reaching to the electrode assembly 1200.

Referring to FIGS. 8 and 12, the method of manufacturing the secondary battery according to the aspect of the present disclosure may include step S1500 of welding the current collector 1300 and the electrode tabs 1220 and 1230. A plurality of first electrode tabs 1220 may be welded to the first current collecting portion 1310. A plurality of second electrode tabs 1230 may be welded to the second current collecting portion 1320. The welding may be performed from a position above the plurality of first electrode tabs 1220 and the plurality of second electrode tabs 1230 toward a downward direction. The welding may employ a method such as ultrasonic welding or laser welding. During welding, at the first current collecting portion 1310 of the current collector 1300, the welding may proceed from the plurality of first electrode tabs 1220 toward the first current collecting portion 1310, and at the second current collecting portion 1320 of the current collector 1300, the welding may proceed from the plurality of second electrode tabs 1230 toward the second current collecting portion 1320.

Referring to FIG. 12, the first electrode tab assembly 1221 may be welded to the first current collecting portion 1310, and the second electrode tab assembly 1231 may be welded to the second current collecting portion 1320. The first electrode tab assembly 1221 may include the first current collector weld portion 1221*e*. The first current collector weld portion 1221*e* may be formed in the first-1 assembly portion 1221*a*. The first current collector weld portion 1221*e* may be formed by welding the first electrode tab assembly 1221 to the current collector 1300. The second electrode tab assembly 1231 may include the second current collector weld portion 1231*e*. The second current collector weld portion 1231*e* may be formed in the second-1 assembly portion 1231*a*. The second current collector weld portion 1231*e* may be formed by welding the second electrode tab assembly 1231 to the current collector 1300.

Referring to FIGS. 11A-11B and 12, after the first and second electrode tab assemblies 1221 and 1231 are formed by primarily welding the plurality of electrode tabs 1220 and 1230, the first and second electrode tab assemblies 1221 and 1231 may be secondarily welded to the current collector 1300. Accordingly, the first and second electrode tab assemblies 1221 and 1231 may include the first and second assembly weld portions 1221*d* and 1231*d* and the first and second current collector weld portions 1221*e* and 1231*e*. As the plurality of electrode tabs 1220 and 1230 are welded in the above-described manner, all of the electrode tabs 1220 and 1230 may be reliably welded to the current collector 1300 such that no unwelded electrode tab remains among the electrode tabs 1220 and 1230. The directions of the first welding and the second welding of the first and second electrode tab assemblies 1221 and 1231 may differ from each other. For example, the first and second assembly weld portions 1221*d* and 1231*d* may be formed in a first dimension (e.g., the +X direction), and the first and second current collector weld portions 1221*e* and 1231*e* may be formed in a second dimension (e.g., the +Y direction). As described above, because the first welding direction and the second welding direction differ from each other, damage to the first and second electrode tab assemblies 1221 and 1231, which may occur due to repetitive welding at the same location, may be prevented. The first and second assembly weld portions 1221*d* and 1231*d* may extend across the first and second electrode tab assemblies 1221 and 1231 in a longitudinal dimension (e.g., the +X direction). A plurality of first current collector weld portions 1221*e* and a plurality of and second current collector weld portions 1231*e* may be formed to be spaced apart from each other in the longitudinal dimension (e.g., the +X direction) of the first and second electrode tab assemblies 1221 and 1231. In the secondary battery 1000 according to an aspect of the present disclosure, the assembly weld portions 1221*d* and 1231*d* formed by primarily welding and the current collector weld portions 1221*e* and 1231*e* formed by secondarily welding may be distinguished from each other. For example, the assembly weld portions 1221*d* and 1231*d* formed by primarily welding and the current collector weld portions 1221*e* and 1231*e* formed by secondarily welding may be formed in directions crossing each other. The assembly weld portions 1221*d* and 1231*d* formed by primarily welding and the current collector weld portions 1221*e* and 1231*e* formed by secondarily welding may also be formed without directionality in different regions of the electrode tab assemblies 1221 and 1231.

In the present aspect, the plurality of electrode tabs are primarily welded such that the first electrode tabs 1220 are welded to one another and the second electrode tabs 1230 are welded to one another, and thereafter welded to the current collector 1300. However, in other aspects, without performing primary welding, the plurality of electrode tabs 1220 and 1230 may be directly bent onto and welded to the current collector 1300. For example, in a secondary battery according to other aspects of the present disclosure, each of the plurality of electrode tabs 1220 and 1230 may be welded to the current collector 1300. That is, in the secondary battery according to other aspects of the present disclosure, each of the plurality of electrode tabs 1220 and 1230 may be bent toward a surface of the current collector 1300 such that the bent electrode tabs 1220 are stacked on one another and the bent electrode tabs 1230 are stacked on one another. Thereafter, the stacked electrode tabs 1220 and the stacked electrode tabs 1230 may be welded to the current collector 1300.

Referring to FIG. 12, the collecting protrusion 1331 may be disposed between the first electrode tab assembly 1221 and the second electrode tab assembly 1231. The collecting protrusion 1331 may be disposed between the first-1 assembly portion 1221*a* and the second-1 assembly portion 1231*a*. The collecting protrusion 1331 may be disposed between the first current collector weld portion 1221*e* and the second current collector weld portion 1231*e*.

Figure 13:
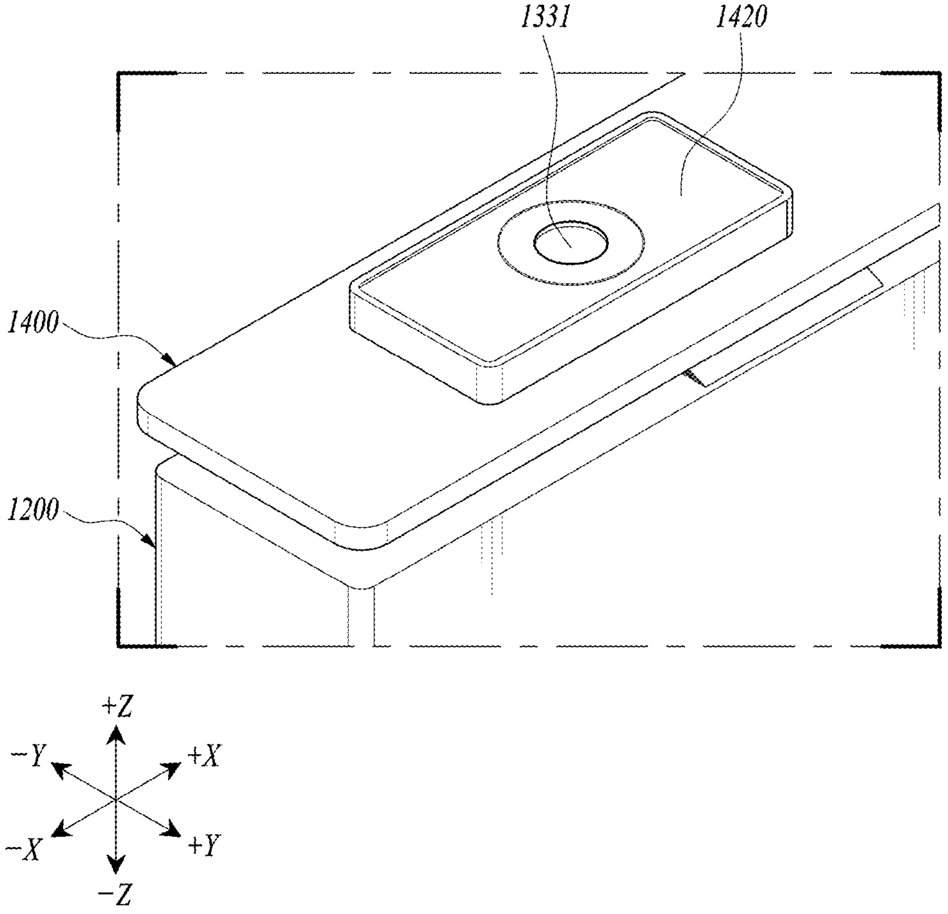
FIG. 13 is a perspective view illustrating a cap assembly coupled to the electrode assembly in the secondary battery according to an aspect of the present disclosure.

Referring to FIGS. 2 and 13, the electrode assembly 1200 to which the current collector 1300 is welded is accommodated in the casing 1100. The cap assembly 1400 may seal the opening of the casing 1100. In this case, after the current collecting protrusion 1331 is inserted into the through hole of the terminal 1420 of the cap assembly 1400, the outer circumferential surface of the end of the current collecting protrusion 1331 may be welded to the inner circumferential surface of the end of the through hole.

Figure 14:
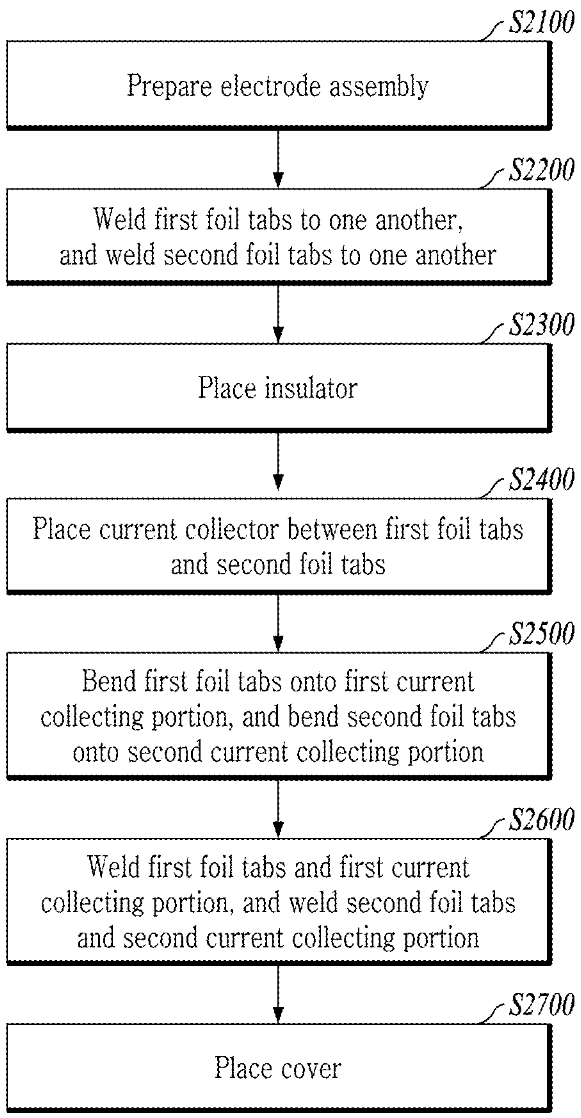
FIG. 14 is a flowchart illustrating a method of manufacturing a secondary battery according to another aspect of the present disclosure.

FIG. 14 is a flowchart showing a method of manufacturing a secondary battery according to another aspect of the present disclosure. FIGS. 15 to 20 are views illustrating the method of manufacturing the secondary battery according to another aspect of the present disclosure. The description of the method of manufacturing a secondary battery according to an aspect of the present disclosure, which has been described with reference to FIGS. 1 to 13, may also be equally applied to the method of manufacturing the secondary battery according to another aspect of the present disclosure described with reference to FIGS. 14 to 20.

Referring to FIGS. 14 to 20, the method of manufacturing the secondary battery may include step S2100 of preparing an electrode assembly 1200. The method of manufacturing the secondary battery may include step S2200 of welding a plurality of first electrode tabs 1220 to one another and welding a plurality of second electrode tabs 1230 to one another. The method of manufacturing the secondary battery may include step S2300 of placing an insulator 1350. The method of manufacturing the secondary battery may include step S2400 of placing a current collector 2300 between the plurality of first electrode tabs 1220 and the plurality of second electrode tabs 1230. The method of manufacturing the secondary battery may include step S2500 of bending the plurality of first electrode tabs 1220 toward a first current collecting portion 2310 and bending the plurality of second electrode tabs 1230 toward a second current collecting portion 2320. The method of manufacturing the secondary battery may include step S2600 of welding the plurality of first electrode tabs 1220 to the first current collecting portion 2310 and welding the plurality of second electrode tabs 1230 to the second current collecting portion 2320. The method of manufacturing the secondary battery may include step S2700 of placing a cover 1360.

Referring to FIGS. 9, 10A-10B, and 14, the method of manufacturing the secondary battery may include step S2100 of preparing the electrode assembly 1200, and step S2200 of welding the plurality of first electrode tabs 1220 to one another and welding the plurality of second electrode tabs 1230 to one another. The contents described with reference to FIGS. 9 and 10A-10B may be equally applied to the descriptions of the respective steps S2100 and S2200. For example, the plurality of first electrode tabs 1220 may be welded to one another to form a first electrode tab assembly 1221 including a first assembly weld portion 1221*d*, and the plurality of second electrode tabs 1230 may be welded to one another to form a second electrode tab assembly 1231 including a second assembly weld portion 1231*d*.

Figure 15A:
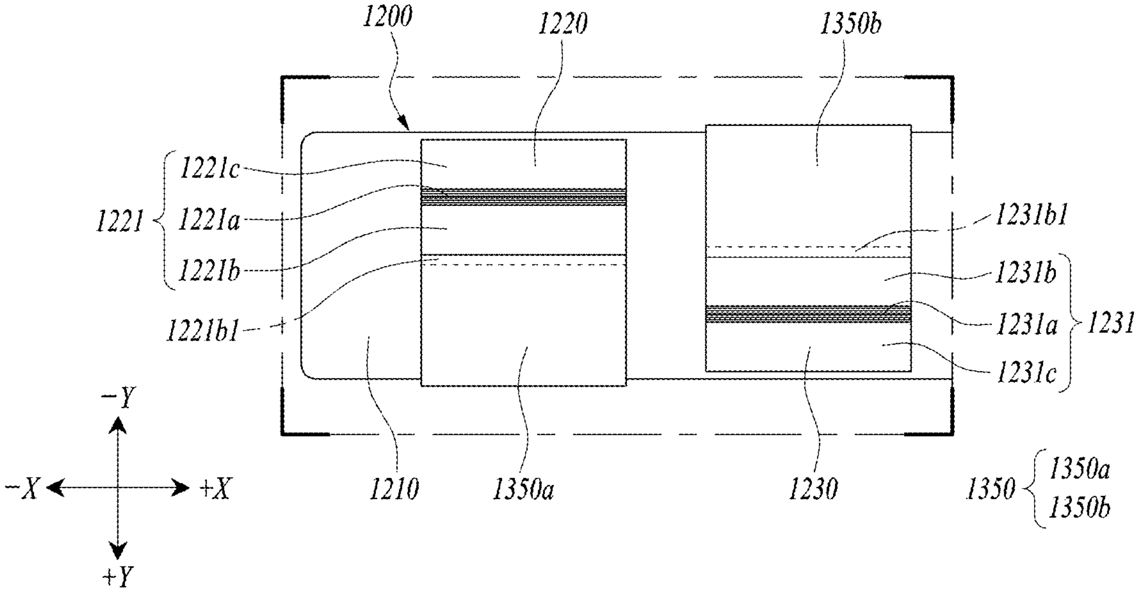
FIGS. 15A and 15B are plan and perspective views, respectively, illustrating a plurality of first electrode tabs and a plurality of second electrode tabs that are grouped in the secondary battery according to another aspect of the present disclosure.
Figure 15B:
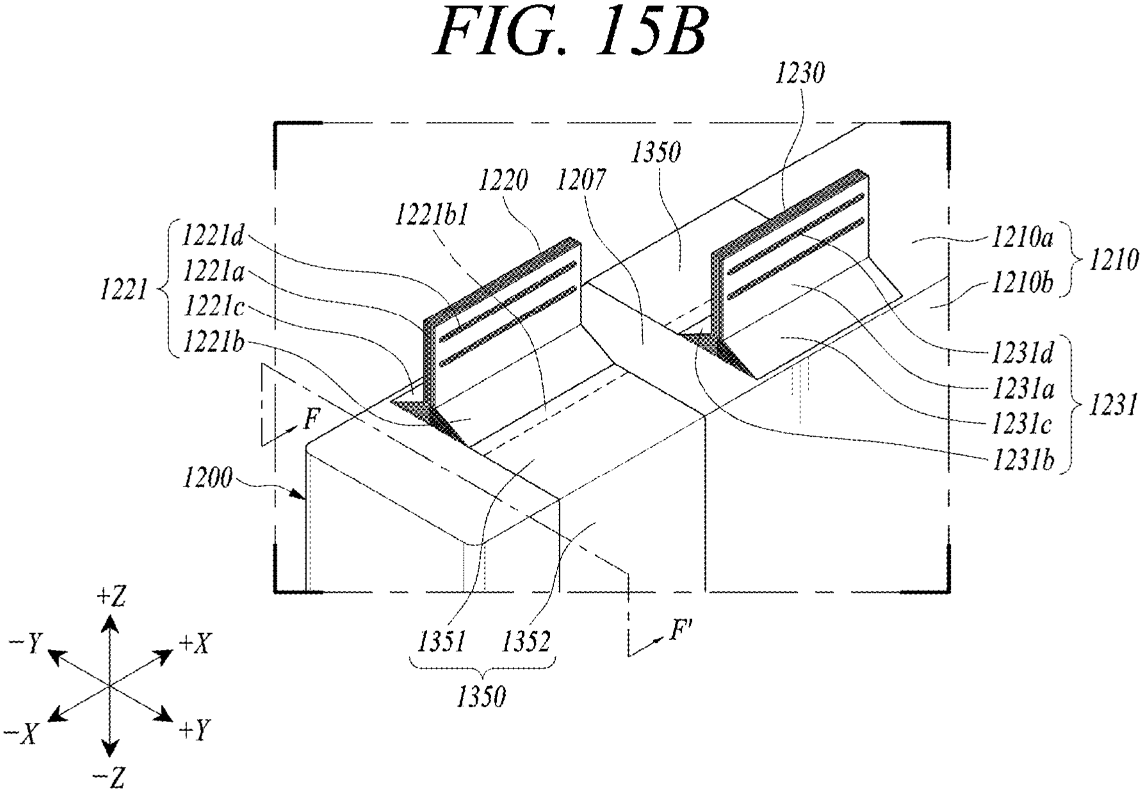
Figure 16:
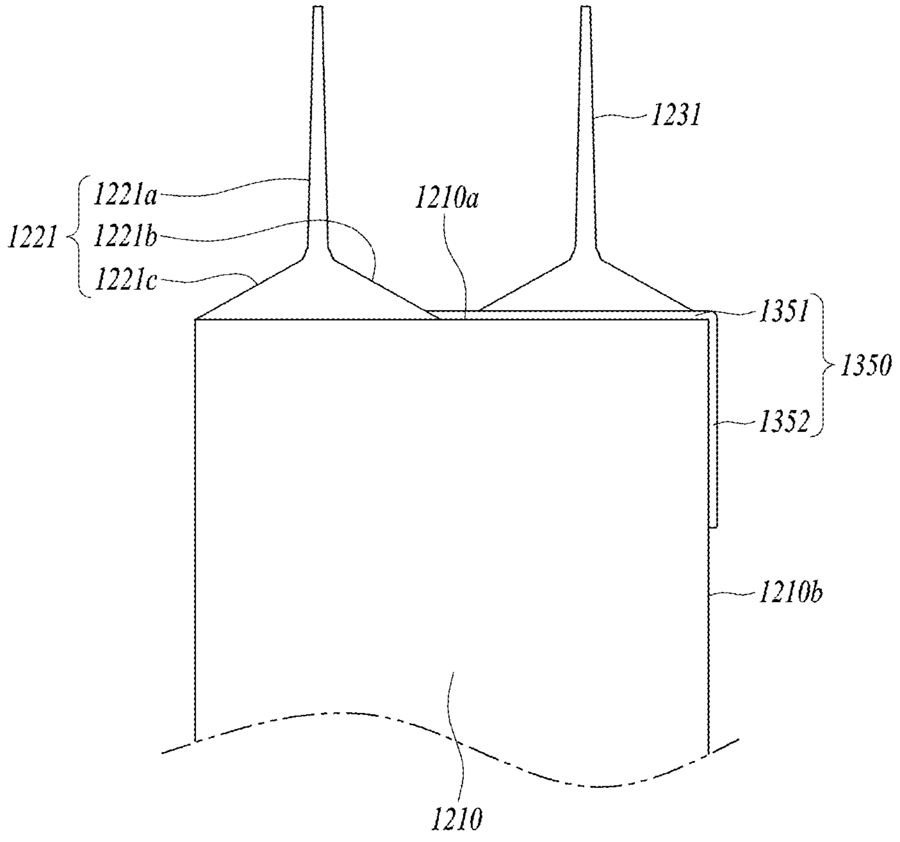
FIG. 16 is a sectional view taken along reference line F-F' of FIG. 15B.

Referring to FIGS. 15A-15B and 16, the insulator 1350 may be included. The insulator 1350 may be disposed to cover at least a portion of the electrode assembly 1200. At least a portion of the insulator 1350 may be bent. The electrode portion 1210 may include a first electrode surface 1210*a* and a second electrode surface 1210*b*. The first and second electrode tab assemblies 1221 and 1231 may be disposed on the first electrode surface 1210*a*. The second electrode surface 1210*b* may extend in a direction intersecting the first electrode surface 1210*a*. The insulator 1350 may include a first insulating portion 1351 and a second insulating portion 1352. The first insulating portion 1351 may cover the first electrode surface 1210*a*. The second insulating portion 1352 may cover the second electrode surface 1210*b*. The insulator 1350 may include a first insulator 1350*a* extending toward the first electrode tab assembly 1221 and a second insulator 1350*b* extending toward the second electrode tab assembly 1231. The insulator 1350 may cover at least a portion of each of the first and second electrode tab assemblies 1221 and 1231. For example, the first insulator 1350*a* may cover at least a portion of the first-2 assembly portion 1221*b*, and the second insulator 1350*b* may cover at least a portion of the second-2 assembly portion 1231*b*. The first electrode tab assembly 1221 may include a first assembly insulation portion 1221*b*1 that is covered by the insulator 1350. The second electrode tab assembly 1231 may include a second assembly insulation portion 1231*b*1 that is covered by the insulator 1350.

Figure 17A:
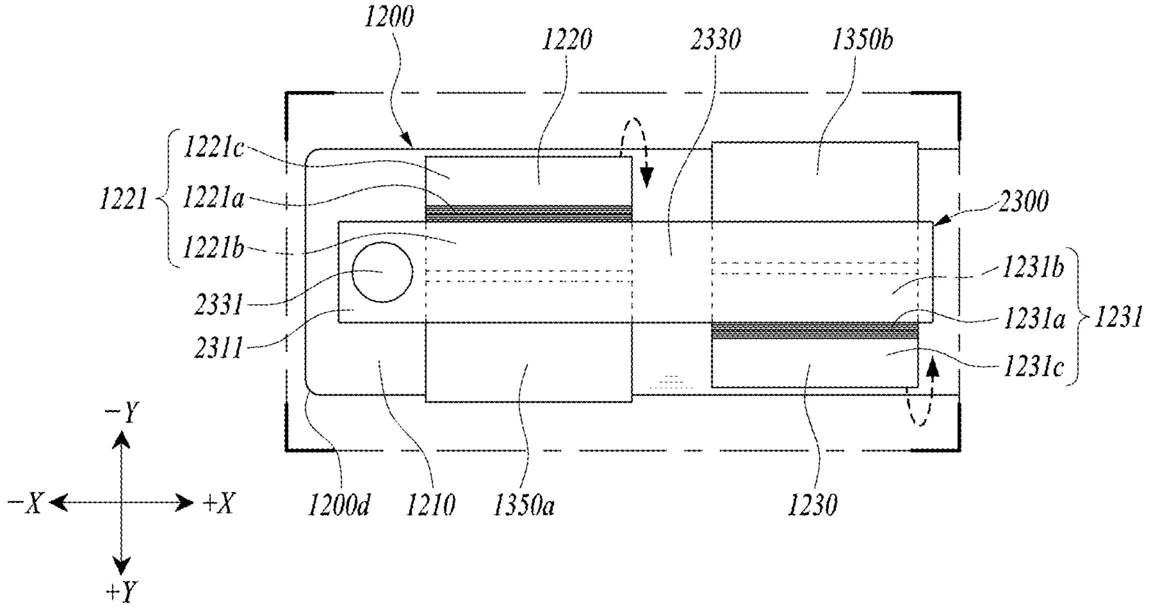
FIGS. 17A and 17B are plan views illustrating sequential steps of placing a current collector between the plurality of first electrode tabs and the plurality of second electrode tabs in the secondary battery according to another aspect of the present disclosure.
Figure 17B:
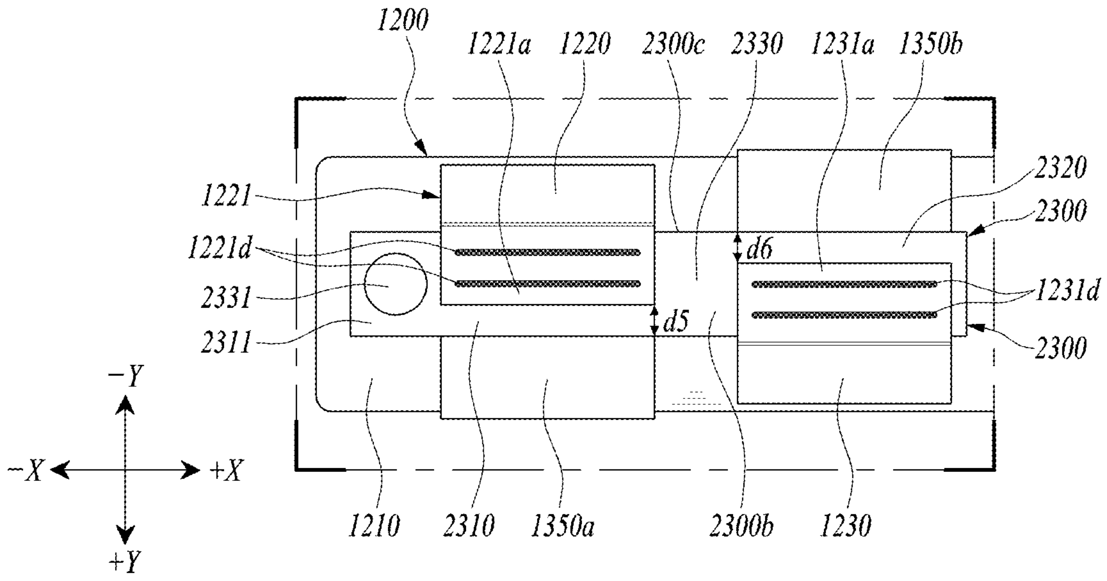
Figure 18:
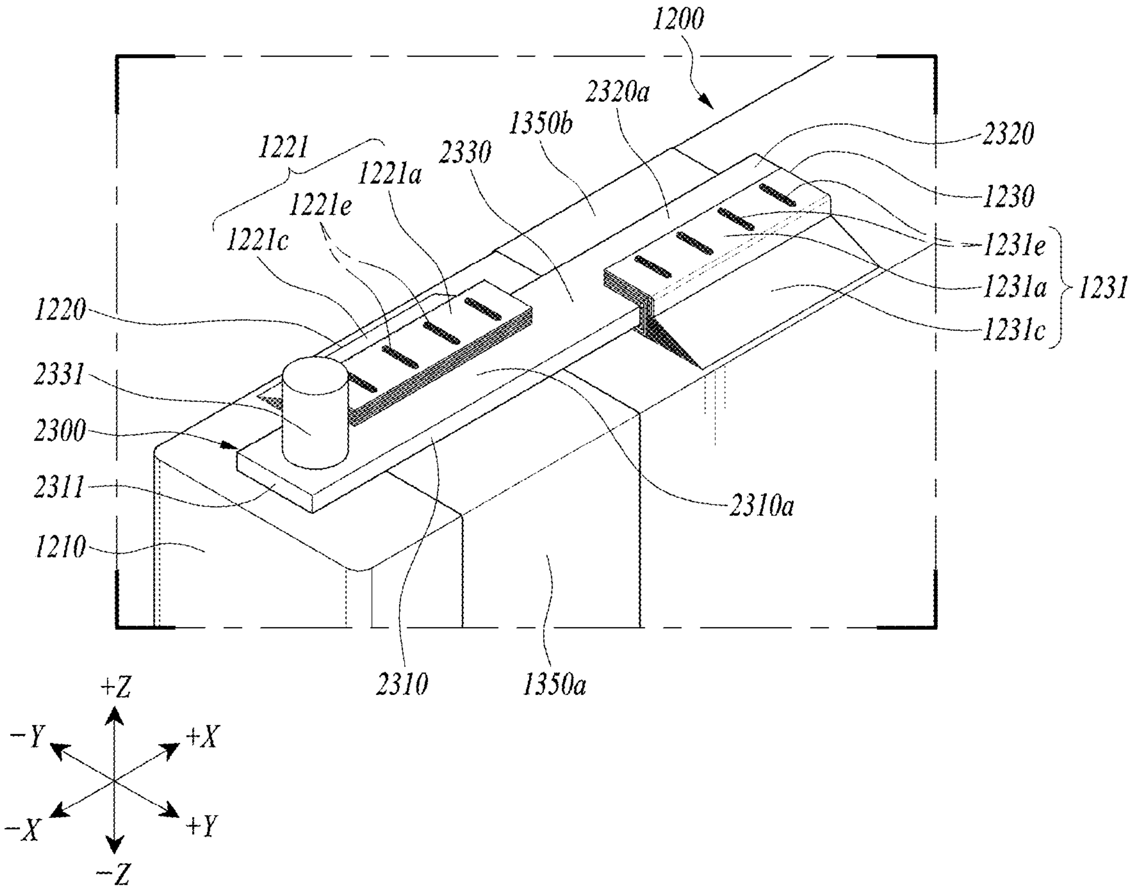
FIG. 18 is a perspective view illustrating the current collector and the first and second electrode tabs welded together in the secondary battery according to another aspect of the present disclosure.

Referring to FIGS. 17A-17B and 18, the current collector 2300 may be disposed on the electrode assembly 1200, and the first and second electrode tab assemblies 1221 and 1231 may be welded to the current collector 2300. The welding structure described with reference to FIGS. 11A-11B and 12A may be equally applied to the structure in which the first and second electrode tab assemblies 1221 and 1231 are welded to the current collector 2300.

Referring to FIGS. 17A-17B and 18, the current collector 2300 may be disposed on the electrode assembly 1200. The current collector 2300 may extend across each of the first electrode tab assembly 1221 and the second electrode tab assembly 1231. The current collector 2300 may include a first current collecting portion 2310 welded to the first electrode tab assembly 1221, and a second current collecting portion 2320 welded to the second electrode tab assembly 1231. The current collector 2300 may include a connection portion 2330 positioned between the first current collecting portion 2310 and the second current collecting portion 2320. The current collector 2300 may include a collector edge 2311. The collector edge 2311 may be disposed at one side of the first current collecting portion 2310. The collector edge 2311 may be located between an edge 1200*d* of the electrode assembly 1200 and the first and second electrode tab assemblies 1221 and 1231. The current collector 2300 may include a current collecting protrusion 2331. The current collecting protrusion 2331 may protrude from the collector edge 2311. The current collecting protrusion 2331 may be positioned between the edge 1200*d* of the electrode assembly 1200 and the first and second electrode tab assemblies 1221 and 1231.

Referring to FIGS. 17A-17B and 18, the first electrode tab assembly 1221 may be bent toward the first current collecting portion 2310. The first electrode tab assembly 1221 may be welded to a first weld surface 2310*a* of the first current collecting portion 2310. The second electrode tab assembly 1231 may be bent toward the second current collecting portion 2320. The second electrode tab assembly 1231 may be welded to a second weld surface 2320*a* of the second current collecting portion 2320. The current collector 2300 may include an upper surface 2300*b* that includes the first weld surface 2310*a* and the second weld surface 2320*a*. The first and second electrode tab assemblies 1221 and 1231 may be welded to the upper surface 2300*b* of the current collector 2300.

Referring to FIGS. 17A-17B and 18, an end of each of the first and second electrode tab assemblies 1221 and 1231 may be spaced apart from an adjacent side surface 2300*c* of the current collector 2300. For example, after the first and second electrode tab assemblies 1221 and 1231 are welded to the current collector 2300, the end of each of the first-1 and second-1 assembly portions 1221*a* and 1231*a* may be spaced apart from the adjacent side surface 2300*c* of the current collector 2300. The end of the first-1 assembly portion 1221*a* may be spaced apart from the adjacent side surface 2300*c* of the current collector 2300 by a first distance d5. The end of the second-1 assembly portion 1231*a* may be spaced apart from the adjacent side surface 2300*c* of the current collector 2300 by a second distance d6.

Referring to FIGS. 17A-17B and 18, the insulators 1350*a* and 1350*b* may be placed between the electrode portion 1210 and the current collector 2300. For example, at least a portion of the first insulator 1350*a* may be placed between the electrode portion 1210 and the first current collecting portion 2310. For example, at least a portion of the second insulator 1350*b* may be placed between the electrode portion 1210 and the second current collecting portion 2320. Due to the placement of the insulators 1350*a* and 1350*b* between the electrode portion 1210 and the current collector 2300, foreign substances generated during welding of the first and second electrode tab assemblies 1221 and 1231 to the current collector 2300 may be blocked from being drawn into the inside of the electrode portion 1210. In addition, the placement of the insulators 1350*a* and 1350*b* may ensure electrical insulation between the electrode portion 1210 and the assemblies in which the electrode tab assemblies 1221 and 1231 are welded to the current collector 2300.

Figure 19:
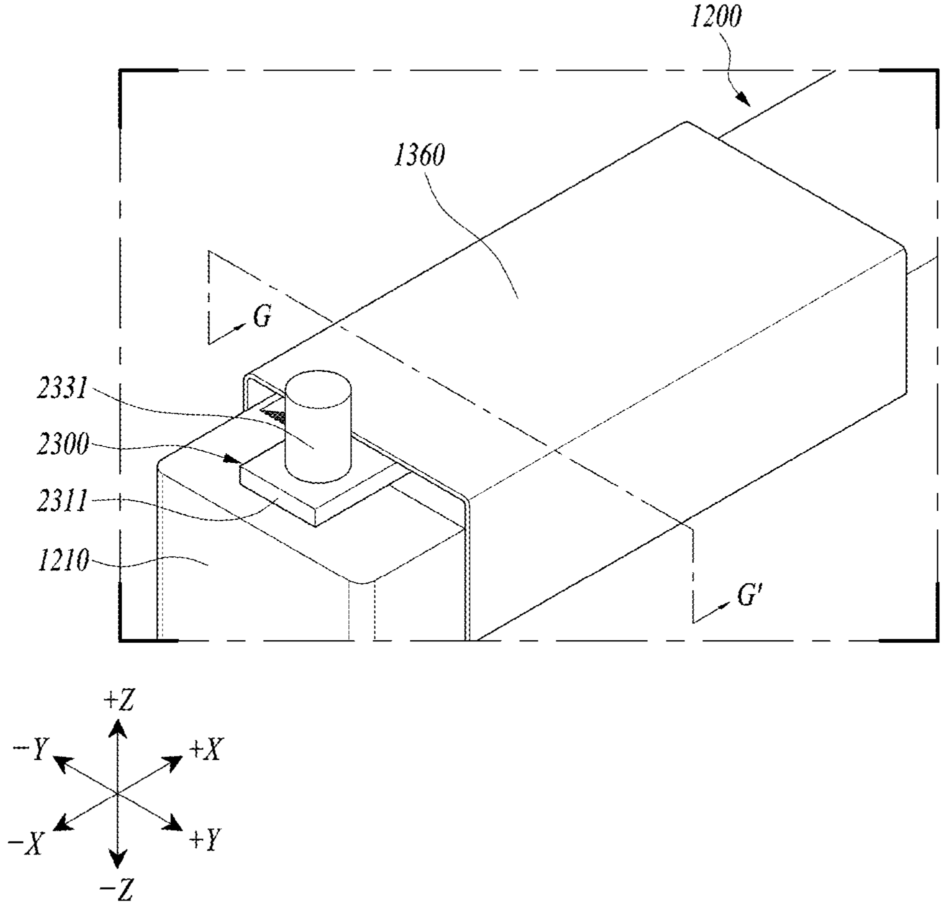
FIG. 19 is a perspective view illustrating a cover disposed in a secondary battery according to another aspect of the present disclosure.
Figure 20:
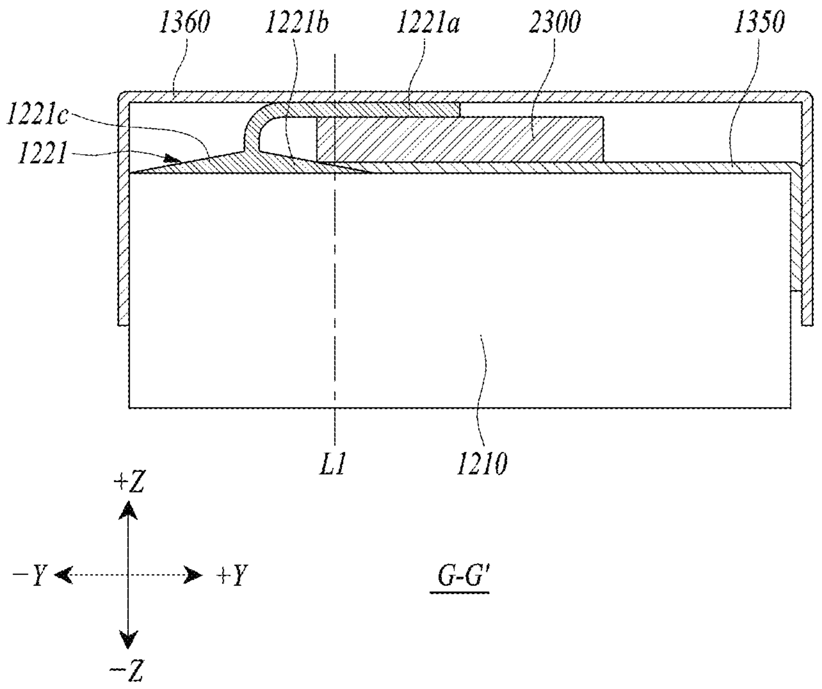
FIG. 20 is a sectional view taken along reference line G-G' of FIG. 19.

Referring to FIGS. 19 and 20, the cover 1360 may be included. The cover 1360 may cover the electrode tab assemblies (e.g., the electrode tab assemblies 1221 and 1231 of FIG. 18) and the current collector (e.g., the current collector 2300 of FIG. 18). The cover 1360 may cover at least a portion of the electrode assembly 1200. The cover 1360 may include an insulating material. The collector edge 2311 and the current collecting protrusion 2331 may be exposed to the outside of the cover 1360. The terminal (e.g., the terminal 1420 or 1420*a* of FIG. 1) may be coupled to the current collecting protrusion 2331 exposed to the outside of the cover 1360.

Referring to FIGS. 19 and 20, the cover 1360 may cover the electrode portion 1210, the insulator 1350, the current collector 2300, and the electrode tab assembly 1221. The cover 1360 may be stacked on each of the electrode portion 1210, the insulator 1350, the current collector 2300, and the electrode tab assembly 1221. For example, the electrode portion 1210, the insulator 1350, the current collector 2300, the electrode tab assembly 1221, and the cover 1360 may be sequentially stacked in one dimension (e.g., the +Z direction). At least a portion of the electrode tab assembly 1221 (e.g., the first-2 assembly portion 1221*b*) may be placed between the electrode portion 1210 and the insulator 1350. On an imaginary line L1 extending in one dimension (e.g., the +Z direction), the electrode portion 1210, the first-2 assembly portion 1221*b*, the insulator 1350, the current collector 2300, the first-1 assembly portion 1221*a*, and the cover 1360 may be sequentially stacked. Due to the aforementioned structure, the first-1 assembly portion 1221*a* may be bent in a state in which the first-2 assembly portion 1221*b* is pressed toward the electrode portion 1210 by the insulator 1350 and the current collector 2300, and thus the bending of the first-1 assembly portion 1221*a* may be facilitated. Furthermore, due to the aforementioned structure, when the first-1 assembly portion 1221*a* is welded to the current collector 2300, the insulator 1350 and the first-2 assembly portion 1221*b* may be located between the current collector 2300 and the electrode portion 1210. Accordingly, foreign substances generated during the welding may be prevented from moving toward the electrode portion 1210.

In the secondary battery according to the related art, because the current collector is welded on top of upwardly-facing portions of the electrode tabs, the current collector is required to be relatively thin to transmit heat to the electrode tabs located under the current collector, thus leading to deterioration in the durability of the secondary battery. However, in the secondary battery according to an aspect of the present disclosure, since the plurality of electrode tabs are bent onto a top surface of the current collector and welded thereto, a sufficient thickness of the current collector may be secured, and the electrode tabs may be more efficiently welded to the current collector.

Furthermore, in the present disclosure, since the plurality of electrode tabs having the same polarity are divided into two groups that are each welded, the electrode tabs may be more stably welded with fewer or no unwelded portions.

In a secondary battery and a method of manufacturing the secondary battery according to an aspect of the present disclosure, damage to a separator can be prevented or reduced when an electrode tab is welded to a current collector.

In a secondary battery and a method of manufacturing the secondary battery according to an aspect of the present disclosure, it is possible to prevent an unwelded portion from occurring in some electrode tabs when a large number of electrode tabs are welded to a current collector.

In a secondary battery and a method of manufacturing the secondary battery according to an aspect of the present disclosure, after a plurality of electrode tabs are primarily welded to one another, the electrode tabs may be secondarily welded to the current collector, thereby preventing or reducing occurrences of unwelded portions.

In a secondary battery and a method of manufacturing the secondary battery according to an aspect of the present disclosure, a first electrode tab assembly and a second electrode tab assembly, which are respectively welded to a first current collecting portion and a second collecting portion of the current collector, may be welded to the current collector at positions spaced apart from each other, thereby preventing interference between the first electrode tab assembly and the second electrode tab assembly.

In a secondary battery and a method of manufacturing the secondary battery according to an aspect of the present disclosure, since the plurality of electrode tabs are divided into two groups, with each group extending across approximately only half of the thickness of the electrode portion 1210 and bent in opposite directions in the manner described above, the groups of tabs may be formed having a height (e.g., in the +/−Z direction with reference to FIG. 10B) which may be less compared to a single group of tabs that extends across an entirety of the thickness of the electrode portion 1210 and must all be bent in the same direction so as to be bent around the current collector. By resulting in a shorter height, less material is needed for forming and manufacturing the groups of tabs. Furthermore, the shorter height and less material frees up additional space within the electrode assembly as compared to a single group of longer tabs having a greater amount of material and height, and the additional space allows for an increase in the electrode size to be included within the assembly. Still further, utilizing shorter tabs which comprise less material would also result in lower electrical resistance in the tabs, thereby improving electrical flow and output.

While the present disclosure has been described with respect to the specific aspects, it will be apparent to those skilled in the art that various changes or modifications of the present disclosure are possible by adding, changing, or deleting components without departing from the spirit of the present disclosure as defined in the following claims. It should be noted that these changes or modifications also fall within the scope of the present disclosure.

What is claimed is:

1. A secondary battery, comprising:

a plurality of first electrode plate portions each including a first electrode tab forming a plurality of first electrode tabs;

a first electrode tab assembly defined by the plurality of first electrode tabs welded to each other;

a plurality of second electrode plate portions each including a second electrode tab forming a plurality of second electrode tabs;

a second electrode tab assembly defined by the plurality of second electrode tabs welded to each other; and a current collector to which the first electrode tab assembly and the second electrode tab assembly are welded, the current collector including a lower surface and an upper surface, wherein the first electrode tab assembly comprises:

a plurality of first assembly weld portions defined by welds joining the plurality of first electrode tabs to each other; and a plurality of first current collector weld portions defined by welds joining the plurality of first electrode tabs to the current collector, and wherein the second electrode tab assembly comprises:

a plurality of second assembly weld portions defined by welds joining the plurality of second electrode tabs to each other; and a plurality of second current collector weld portions defined by welds joining the plurality of second electrode tabs to the current collector, wherein the first current collector weld portions of the first electrode tab assembly are welded to a first weld surface portion on the upper surface, and the second current collector weld portions of the second electrode tab assembly are welded to a second weld surface portion on the upper surface, wherein the first weld surface portion and the second weld surface portion each face in a direction opposite the lower surface, and the first weld surface portion and the second weld surface portion are spaced apart in a longitudinal direction of the upper surface, wherein the first assembly weld portions and the second assembly weld portions extend along a first dimension, wherein the first current collector weld portions and the second current collector weld portions extend along a second dimension that is different from the first dimension, wherein welds of the first assembly weld portions are spaced apart in the second dimension and welds of the second assembly weld portions are spaced apart in the second dimension, and wherein welds of the first current collector weld portions are spaced apart in the first dimension and welds of the second current collector weld portions are spaced apart in the first dimension.

2. The secondary battery according to claim 1, wherein the first electrode tab assembly comprises a first-1 assembly portion in which the first assembly weld portions and the first current collector weld portions are formed, and wherein the second electrode tab assembly comprises a second-1 assembly portion in which the second assembly weld portions and the second current collector weld portions are formed.

3. The secondary battery according to claim 1, further comprising an electrode assembly defined by a stack of the plurality of first electrode plate portions stacked with a stack of the plurality of second electrode plate portions, wherein the first electrode tab assembly comprises a first-2 assembly portion located between the first current collector weld portions and the electrode assembly, and wherein the second electrode tab assembly comprises a second-2 assembly portion located between the second current collector weld portions and the electrode assembly.

4. The secondary battery according to claim 3, wherein the current collector comprises:

a first current collecting portion located between the first current collector weld portions and the first-2 assembly portion; and a second current collecting portion located between the second current collector weld portions and the second-2 assembly portion.

5. The secondary battery according to claim 1, further comprising an electrode assembly defined by a stack of the plurality of first electrode plate portions stacked with a stack of the plurality of second electrode plate portions, the lower surface of the current collector faces the electrode assembly;

the first assembly weld portions and the first current collector weld portions are joined on the first weld surface portion; and the second assembly weld portions and the second current collector weld portions are joined on the second weld surface portion.

6. The secondary battery according to claim 1, wherein the plurality of the first current collector weld portions are located in a welding region of the first plurality of electrode tabs that is between 1/7 to 1/5 of an area of the plurality of first electrode tabs bent over the current collector and the plurality of the second current collector weld portions are located in a welding region of the second plurality of electrode tabs that is between 1/7 to 1/5 of an area of the plurality of second electrode tabs bent over the current collector.

* * * * *